(12) United States Patent
Gu et al.

(10) Patent No.: US 8,571,546 B2
(45) Date of Patent: Oct. 29, 2013

(54) METHOD FOR IMPLEMENTING DUAL-HOMING

(75) Inventors: Jiongjiong Gu, Guangdong (CN); Chunhui Zhao, Shenzhen (CN); Yunxia Cai, Guangdong (CN); Zhenhua Liu, Guangdong (CN); Hanbing Chen, Guangdong (CN); Changcheng Guo, Guangdong (CN); Yong Zhong, Guanngdong (CN); Yong Lin, Guangdong (CN); Weiqiang Zhou, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 168 days.

(21) Appl. No.: 13/350,261

(22) Filed: Jan. 13, 2012

(65) Prior Publication Data

US 2012/0106318 A1    May 3, 2012

Related U.S. Application Data

(63) Continuation of application No. 11/709,263, filed on Feb. 22, 2007, now Pat. No. 8,116,760, which is a continuation of application No. PCT/CN2005/001345, filed on Aug. 29, 2005.

(30) Foreign Application Priority Data

| Aug. 29, 2004 | (CN) | .......................... | 2004 1 0076730 |
| Apr. 18, 2005 | (CN) | .......................... | 2005 1 0064728 |
| Jun. 17, 2005 | (CN) | .......................... | 2005 1 0077610 |
| Jun. 21, 2005 | (CN) | .......................... | 2005 1 0035480 |
| Jul. 26, 2005 | (CN) | .......................... | 2005 1 0087133 |

(51) Int. Cl.
   *H04W 4/00*    (2009.01)

(52) U.S. Cl.
   USPC .................. 455/426.1; 455/426.2; 455/414.1; 455/450

(58) Field of Classification Search
   USPC .......................... 455/426.1, 426.2, 414.1, 450
   See application file for complete search history.

(56) References Cited

U.S. PATENT DOCUMENTS

| 6,067,443 | A  | * | 5/2000  | Fuller et al. ................... 340/7.58 |
| 6,775,542 | B1 | * | 8/2004  | Vilander et al. .............. 455/423 |
| 2004/0258045 | A1 | | 12/2004 | Groves et al. |

FOREIGN PATENT DOCUMENTS

| CN | 1378368 A | 11/2002 |
| CN | 1406031 A | 3/2003 |

(Continued)

OTHER PUBLICATIONS

Office Action dated Nov. 6, 2009 in connection with U.S. Appl. No. 11/709,263.

(Continued)

*Primary Examiner* — Nghi H Ly

(57) ABSTRACT

The invention discloses a method for implementing dual-homing, including: setting each one of any two core control equipment as a standby for each other, connecting a network entity belonging to one of the core control equipment with the two core control equipment through a primary link and a standby link respectively; setting the primary link connected with the core control equipment as activated, and setting the standby link connected with the core control equipment inactive; determining whether the core control equipment corresponding to the primary link is out of service, if the core control equipment corresponding to the primary link is out of service, activating the standby link; otherwise, continuously determining whether the core control equipment corresponding to the primary link is out of service. The invention also discloses another method for implementing dual-homing, by which the reliability of the network can be improved.

6 Claims, 8 Drawing Sheets

(56) References Cited

FOREIGN PATENT DOCUMENTS

| CN | 1463116 A | 12/2003 |
|---|---|---|
| CN | 1463127 A | 12/2003 |
| CN | 1545345 A | 11/2004 |
| CN | 1579102 A | 2/2005 |
| CN | 1741665 A | 3/2006 |
| EP | 1 162 859 A2 | 12/2001 |
| EP | 1 432 204 A2 | 6/2004 |
| WO | WO 03/101050 A1 | 12/2003 |
| WO | WO 2005/025143 A1 | 3/2005 |
| WO | WO 2007/006198 A1 | 1/2007 |

OTHER PUBLICATIONS

Written Opinion of the International Searching Authority dated Sep. 21, 2006 in connection with International Patent Application No. PCT/CN2006/001216.
Office Action dated May 19, 2008 in connection with Australian Patent Application No. 2005279575.
ITU-T Recommendation H.248, "Series H: Audiovisual and Multimedia Systems, Infrastructure of audiovisual services—Communication procedures, Gateway contro protocol", Jun. 2000, 132 pages.
Office Action dated Feb. 1, 2008 in connection with Chinese Patent Application No. 200510097783.0.
Partial Translation of Office Action dated Nov. 30, 2007 in connection with Chinese Patent Application No. 200510035480.6.
Office Action dated Aug. 22, 2008 in connection with Chinese Patent Application No. 200510035898.7.
Notification of Reexamination dated Jan. 21, 2010 in connection with Chinese Patent Application No. 200510035898.7.
Supplementary European Search Report dated Oct. 9, 2007 in connection with European Patent Application No. EP 05 78 1860.

\* cited by examiner

METHOD FOR IMPLEMENTING DUAL-HOMING

CROSS-REFERENCE TO RELATED APPLICATIONS

This application is a continuation of U.S. patent application Ser. No. 11/709,263, filed on Feb. 22, 2007, which is a continuation of International Application No. PCT/CN2005/001345, filed on Aug. 29, 2005. The International Application claims priorities to Chinese Patent Application No. 200410076730.6, filed on Aug. 29, 2004, Chinese Patent Application No. 200510035480.6, filed on Jun. 21, 2005, Chinese Patent Application No. 200510064728.1, filed on Apr. 18, 2005, Chinese Patent Application No. 200510077610.2, filed on Jun. 17, 2005, and Chinese Patent Application No. 200510087133.8, filed on Jul. 26, 2005, all of which are hereby incorporated by reference in their entireties.

FIELD OF THE INVENTION

The present invention relates to the dual-homing technique in a communication network, and more particularly, to a method for implementing dual-homing.

BACKGROUND

Along with user's increasing demand for a higher security reliability and a higher processing capacity of the network, the operator must introduce enough capacity and various diversity means to the network when designing the network at the beginning in order to provide enough service ability for the users, reduce the influence of troubles and raise the ability of preferential recovery, double access and multi-routing of the network, which ensures normal service provision and enhances the users' satisfaction with the service. But on the other hand, if core control equipment or core processing equipment adopts an active/standby mode, not only the cost of networking and maintaining will be increased, but also a heavy resource waste will be caused as a result of the idle state of the stand-by equipment.

So, under a comprehensive consideration of several factors, such as the integrated level, the cost, disaster tolerance capability and network security of equipment, etc, the dual-homing concept is introduced, whose function lies in preventing large area paralyzed systems or offering a mechanism of communication promptly when an accident suddenly appears, offering a fast recovery ability of equipment communication when an unusual situation takes place. For example: a recovery mechanism including a urgent communication can offer 80%.about.90% ability of the communication recovery. The dual-homing thereinafter refers to a special network connection, by which each network entity which needs the switching control center to provide a service is connected with two switching control centers at the same time, the two switching control centers are standby for each other, every network entity can be provided with the service by either of the two joined switching control centers. Generally, each network entity has a homing switching control center of itself. In normal state, each switching control center manages one or more network entities of its own, i.e., each switching control center provides services for the network entities of its own, when any switching control center breaks down, the standby switching control center will take over all the network entities under the switching control center that has broken down. The switching control center refers to a network equipment at a core position in a network, for example: a softswitch, a Mobile Switching Center (MSC) server, etc, the processing capability and the disaster tolerance capability which are provided by the dual-homing technique have much to do with the networking and the implementation of the dual-homing.

The communication networks used at present can be divided into wired communication networks and wireless communication networks, a typical representative of the latest wired communication network is Next Generation Network (NGN). The NGN is a brand-new network incorporating voice, data, fax and video services into an organic whole, which has achieved the separation of call control and service bearer; a typical representative of the latest wireless communication network is the third generation (3G) mobile communication network. The user capacity of the NGN and the 3G network are both very large, the requirements for the communication reliability and the network processing ability are also very high, so, the dual-homing mode can be introduced to the networking of NGN and 3G networks. Specifically, in the networking of NGN, the softswitch is at an extremely core and important position, between which no default standby relation exists on the networking level. In order to make the service handled by the softswitch breaking down be taken over automatically by its standby softswitch and to minimize the service interruption under the circumstances of the softswitch breaking down, an unusual disaster, or a hardware upgrading, it is needed to realize the dual-homing of the softswitch so as to enhance the network reliability. The dual-homing here means that two softswitches are mutually standby on the networking level, as shown in FIG. 1. In this way, a softswitch at the dual-homing position is able to take over the service of the other softswitch which shuts down or is out of service.

In the NGN shown in FIG. 1, two softswitches are mutually standby softswitches, each softswitch is configured with an Originating Point Code (OPC), and a Public Switched Telephone Network (PSTN) connects the softswitch to access the network through a Media Gateway (MGW). The softswitch and the MGW are connected and the data are transmitted between them through a trunk signaling link. In the normal state, each softswitch serves the MGW of its own separately, if a softswitch is shut down or in other breakdown situations, the MGW connected to the softswitch needs register to the standby softswitch again, so as to ensure the service continuity. A signaling point is a node processing the control information in the signaling network.

Similarly, in a 3G core network, the MSC Server is at an extremely core and important position, between which no default standby relation exists on the networking level. In order to make the service handled by the breaking-down MSC Server can be taken over automatically by its standby MSC Server and to minimize the service interruption under the circumstances of an MSC Server breaking down, a unusual disaster or a hardware upgrading, it is needed to realize the dual-homing to the MSC Server so as to enhance the network reliability. The dual-homing here means that two MSC Servers are mutually standby on the networking level, as shown in FIG. 2, in such a way that an MSC Server at the dual-homing position is able to take over the service of the other MSC Server that has been inactive or has been in the out-of-service state.

The 3G network is shown in FIG. 2, two MSC Servers are mutually standby, each MSC Server is configured with the OPC, and a Base Station Controller (BSC)/Radio Network Controller (RNC) connects the MSC Server to access the network through the MGW. The MGW and the MSC Server connects with each other and transmits data between them through trunk signaling links. In the normal state, each MSC Server serves the MGW of its own separately, if some MSC Server equipment shuts down or in other breakdown situations, the MGW connected to the MSC Server that shuts down or breaks down needs to register to the standby MSC Server again so as to ensure the service continuity.

SUMMARY

A method for implementing dual-homing is provided, which can improve the utilization ratio of the core control equipment while guaranteeing reliability of the network; and realize the smooth switching between equipment with dual-homing relations.

Another method for implementing dual-homing is also provided, which can realize the switching between the dual-homing equipment in time, improve the reliability of the network.

A method for implementing dual-homing, including: setting each one of any two pieces of core control equipment as a standby for the other core control equipment, and connecting a network entity belonging to one of the two core control equipment with the two core control equipment through a primary link and a standby link, respectively; setting the primary link connected with the core control equipment as activated, and shutting down the standby link connected with the core control equipment;
determining whether the core control equipment corresponding to the primary link is out of service, if the core control equipment corresponding to the primary link is out of service, activating the standby link; otherwise, and determining whether the core control equipment corresponding to the primary link is out of service.

A method for implementing dual-homing, including: setting each one of any two Media Gateway Control Function (MGCF) entities as a standby for the other MGCF, each MGCF managing at least one Media Gateway (MGW); determining whether the MGW needs to register to a standby MGCF or not, if the MGW needs to register to the standby MGCF, upon detecting a new MGW registration, the standby MGCF activating or setting up all the signaling links related with the MGW, and refreshing the route information of the called party; if the MGW doesn't need to register to the standby MGCF, returning to the step of determining whether the MGW needs to register to the standby MGCF or not again.

A piece of home equipment in dual-homing, including:
a data obtaining unit, connecting with a mutual-aid equipment of the home equipment and a data storage unit, being used for obtaining data of the mutual-aid equipment, and storing obtained data to the data storage unit;
the data storage unit being used for saving the data obtained by the data obtaining unit from the mutual-aid equipment;
a heartbeat signal detection unit connecting with the mutual-aid equipment, a service switchover unit and a service tear down control unit, being used for detecting state of the mutual-aid equipment, and notifying the detected state of the mutual-aid equipment to the service switchover control unit and the service tear down control unit;
the service switchover control unit connecting with the heartbeat signal detection unit and the data storage unit, being used for adopting the mutual-aid equipment's data saved in the data storage unit to take over a service of the mutual-aid equipment and control equipment originally controlled by the mutual-aid equipment, when the heartbeat signal detection unit detecting that the state of the mutual-aid equipment is invalid;

the service tear down control unit being connected with the heartbeat signal detection unit and the data storage unit, being used for adopting the mutual-aid equipment's data saved in the data storage unit to tear down the service taken over from the mutual-aid equipment and give the service back to the mutual-aid equipment, when the heartbeat signal detection unit detecting that the state of the mutual-aid equipment is changed from an invalid state to a normal state.

A piece of controlled equipment in dual-homing, wherein the controlled equipment is used for sending a heartbeat signal to its home equipment periodically in a normal state, detecting a returned heartbeat signal from its home equipment;
the controlled equipment is further used for sending the heartbeat signal to the home equipment periodically if receiving a normal heartbeat signal returned from the home equipment;
the controlled equipment is further used for initiating a dual-homing switch to mutual-aid equipment of its home equipment, taking the mutual-aid equipment of its home equipment as its new home equipment, and sending the heartbeat signal to the new home equipment, if the controlled equipment does not receive a normal heartbeat signal from the home equipment within a pre-defined time, or interrupt time of the returned heartbeat signal from the home equipment is larger than a set threshold.

A system for implementing dual-homing, including:
first home equipment and second home equipment, which are set as a standby for each other;
a piece of controlled equipment belonging to the first home equipment or the second home equipment, setting its home equipment as primary home equipment, setting mutual-aid equipment of its home equipment as standby home equipment, connecting the primary home equipment and the standby home equipment with a primary link and a standby link respectively, if the primary home equipment is in a normal state, the primary link being activated and the standby link being inactive; if the primary equipment is in an invalid state, the standby link being activated and the primary link being inactive.

As can be seen from above, the implementation method of dual-homing provided by the invention can guarantee, under the circumstances that some core control equipment shuts down or are in other failures etc., that the MGW which belongs to the failure core control equipment can detect in time the failure taking place, switch to other core control equipment in time, thus effectively preventing the MGW from being unable to switch normally to other core control equipment when there is random failure of the core control equipment as in the prior art, effectively avoiding the situation of call loss, effectively avoiding chaotic MGW registration, and making the dual-homing function of the MGW further improved.

The core control equipment having a dual-homing relationship with a core control equipment that falls into an out-of-service state can process the service of the out-of-service core control equipment, so the reliability of the next generation network (NGN) can be improved greatly, and because both of the core control equipment with the dual-homing relationship work under the normal state, therefore, the method of the invention can improve the utilization ratio of core control equipment.

In addition, when certain core control equipment breaks down, the signaling gateway which interacts with it can detect the core control equipment has broken down while not determining that the destination signaling point of the signaling message is unreachable. Instead, the signaling gateway sends the signaling message to the core control equipment in the mutual-aid relationship with the failed core control equipment through a lower priority link or route. Thus, for other signaling points in the network, there is no such a communication recovering process from the failure, and a smooth switching of the signaling gateway is implemented.

Furthermore, in the implementation method of dual-homing of signaling gateway based on route priority, because redundant links between the core control equipment and the signaling point of the signaling gateway are not needed, the utilization ratio of links can be raised, and the capability of the NGN for transmitting and processing signaling can be effectively guaranteed.

The data processing scheme of the core control equipment with dual-homing relationship provided by the invention can maintain the data consistency between the core control equipment with dual-homing relationship, and support the continuity of the link management and the service processing before and after the switching of the MGW, thus ensuring smooth switching of the MGW.

DETAILED DESCRIPTION

Figure 1:
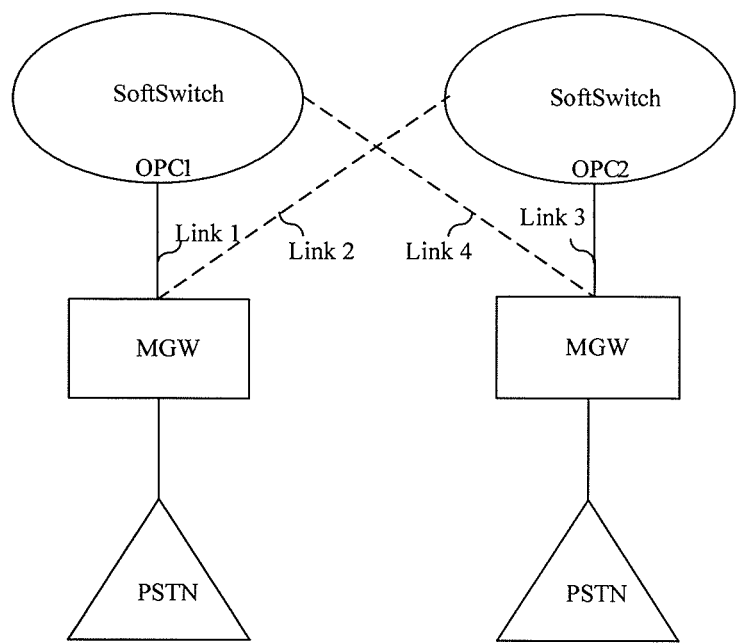
FIG. 1 is a schematic diagram illustrating a dual-homing networking based on a NGN network.
Figure 2:
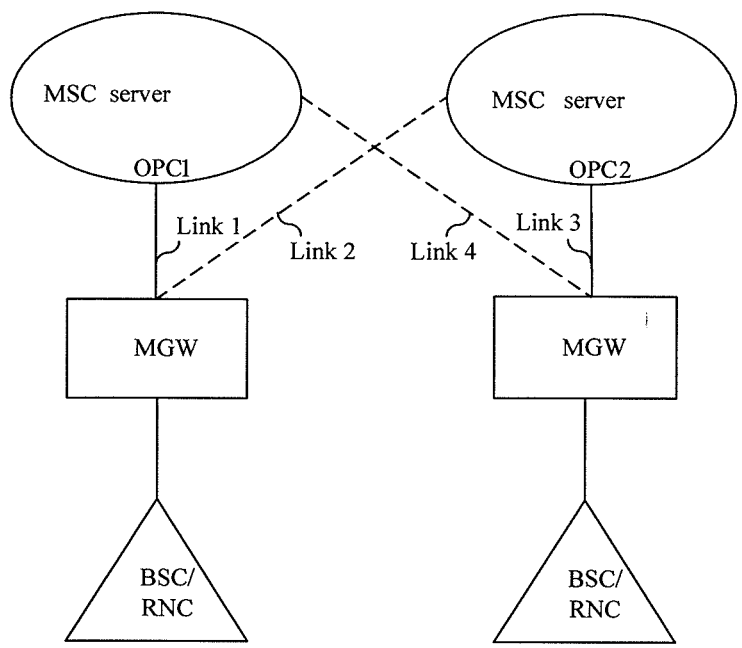
FIG. 2 is a schematic diagram illustrating a dual-homing networking based on a 3G network.

In the dual-homing networking scheme shown in FIG. 1 and FIG. 2, two problems exist:

1) Under the dual-homing state, the core control equipment mutually standby, for example, the softswitch or the MSC Server, uses different independent signaling points, after the dual-homing switching, a Time Division Multiplexing (TDM) trunk signaling link on the MGW of the failed signaling point is automatically switched to the TDM relaying group of the valid signaling point. Then, because of the shutdown or other breakdowns of the out-of-service core control equipment, the signaling point of the out-of-service core control equipment is invalid, which leads to switch to the signaling point of the opposite-end network entity, so the trunk signaling link resources of the valid signaling point is utilized, But the TDM trunk signaling link resources of the failed signaling point is no longer utilized, which will cause a serious waste of trunk resources.

2) In practical applications, when any one of the mutually standby core control equipment shuts down or has been in the out-of-service state, it is needed to carry out the dual-homing switching. At this time, since the out-of-service core control equipment is unable to transmit messages to its own home equipment, how to promptly realize the switching between the mutually standby core control equipment, and then guarantee the communication continuity, and the network reliability have not been answered by an effective solution yet so far.

In view of the problem of wasting the trunk resources, the basic idea of the invention is that: the core control equipment with the dual-homing relationship, for example, the softswitch or the MSC Server, displays the only signaling point to the peer end network entity, realizes the link state management of Message Transfer Part (MTP) through the dual-homing state saved in the core control equipment, realizes the message automatic switch using the standby route of the Message Transfer Part level 3(MTP3) or the signaling link, and ensures the smooth switching between the equipment with the dual-homing relationship under the circumstance that the only signaling point detected by the peer end network entity does not change.

Embodiment One

The embodiment is aiming at the dual-homing networking based on the NGN. In the embodiment, the core control equipment is the softswitch; the peer end network entity is the MGW. Each softswitch in the embodiment has the active and the standby signaling point cross-established, and corresponds to the active and the standby link. In normal state, only one signaling point and the corresponding link are used when the softswitch and the MGW communicate with each other.

Figure 3:
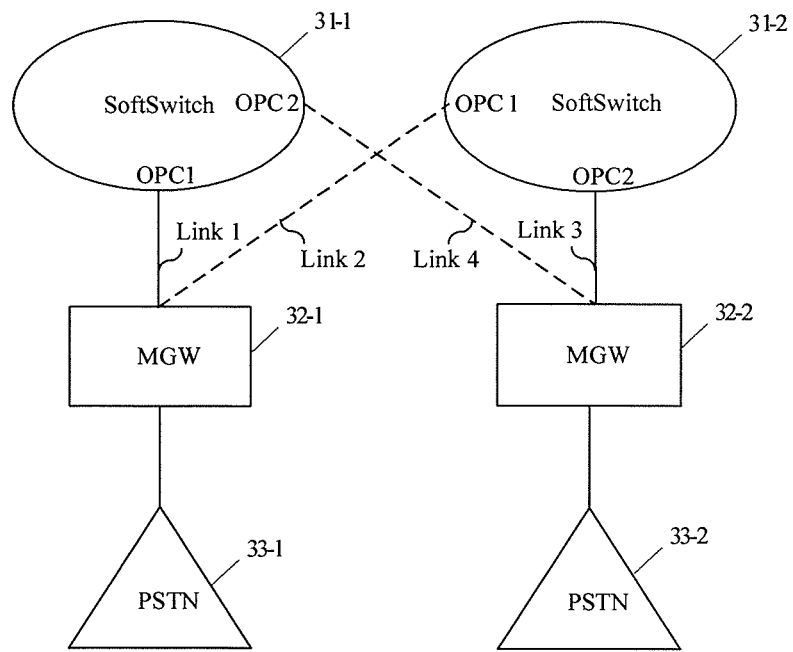
FIG. 3 is a schematic diagram illustrating a dual-homing networking based on a NGN network in accordance with Embodiment one of the present invention.

FIG. 3 is a schematic diagram illustrating the dual-homing networking based on the NGN network in accordance with an embodiment of the present invention. As shown in FIG. 3, the system of the dual-homing network includes: a softswitch 31-1 and a softswitch 31-2, an MGW 32-1 and an MGW 32-2, a PSTN 33-1 and a PSTN 33-2. The softswitch 31-1 and the softswitch 31-2 are the dual-homing offices being the active and the standby for each other. Here, "-number" is used to distinguish the equipment with the same function.

It should be noted that, the scheme of the embodiment is also applicable to the networking of the softswitch with media resource server, application server, Smart Home Location Register (SHLR), PSTN, Service Control Point (SCP) and equipment of the softswitch etc., the embodiment only takes the networking of the softswitch and the MGW as an example to show the specific implementation of the technical scheme, the specific implementations of other networking schemes are similar to the embodiment.

In FIG. 3, the PSTN 33-1 connects to the softswitch 31-1 and the softswitch 31-2 through the MGW 32-1, the PSTN 33-2 connects to the softswitch 31-1 and the softswitch 31-2 through the MGW 32-2. The link between the MGW 32 and two softswitches 31 with the dual-homing relationship is a load sharing link of one link set, specifically speaking, link 1 and link 2 belong to one link set, link 3 and link 4 belong to another one link set, the configuration of the same link set can be implemented on the MGW 32. In order to explain it conveniently, the link between the MGW 32 and the softswitch 31 which the MGW 32 belongs to is called the primary link, the link between the MGW 32 and another backing-up softswitch 31 is called the standby link. It should be noted that, although the link is in the load sharing mode, in the normal state, however, the PSTN only selects the primary link, as shown in FIG. 3, the primary link is indicated with a solid line, and the standby link is indicated with a dashed line.

The primary signaling point OPC1 and the standby signaling point OPC2 are set up in the softswitch 31-1, the primary signaling point OPC2 and the standby signaling point OPC1 are set up in the softswitch 31-2, so that the OPC1 is the primary signaling point of the softswitch 31-1, and the standby signaling point of the softswitch 31-2; similarly, the OPC2 is the primary signaling point of the softswitch 31-2, and the standby signaling point of the softswitch 31-1. In other words, for the softswitch 31-1, the OPC1 is the only signaling point which the activated PSTN 33-1 detects in the normal state, the OPC2 is the only signaling point which the PSTN 33-2 detects in the standby state; similarly, for the softswitch 31-2, the OPC2 is the only signaling point which the activated PSTN 33-2 detects in the normal state, the OPC1 is the only signaling point which the PSTN 33-1 detects in the standby state.

The softswitch 31 is used to carry out the softswitch processing, detect the state of the softswitch 31 having the active or standby relationship with it, and determine whether to activate the MTP3 link of the standby signaling link according to the detected result. For example: when the softswitch 31-2 detects the standby softswitch 31-1 is inactive or is out of service, the MTP3 link of the standby signaling point OPC1, that is, the link 2, is activated to switch the link of interface A of the PSTN 33-1 to the link 2. In this way, the message of the PSTN 33-1 will be automatically sent to the softswitch 31-2, the softswitch 31-2 will smoothly take over the service of the softswitch 31-1 for processing. Here, the function and the corresponding configuration of the MGW 32 and the PSTN 33 are the same as in the prior art, and no detailed description will herein be given.

The scheme of the embodiment is applicable to the processing of the following situations:

In the normal state, the dual-homing softswitch 31 shuts down all the MTP3 links of the local office in the standby state through a management prohibition mode. Specifically speaking, when the softswitch 31-1 and 31-2 are both in the normal state, the softswitch 31-1 shuts down the link 2, and the softswitch 31-2 shuts down the link 4, so the signaling message of the PSTN 33 can be prevented from sending to two softswitchs 31 at the same time.

When the primary softswitch 31 is shutdown, the standby softswitch detects the failure of the peer end, and activates the corresponding MTP3 link of the standby signaling point in the local office. It should be noted that, here the softswitches are mutually standby, so the active and standby relation is only a relative conception. Taking the example of the softswitch 31-1 as the primary softswitch, when detecting the softswitch 31-1 is shutdown or is out of service, the softswitch 31-2 activates the MTP3 link of the standby signaling point OPC1 in the local office, that is, the link 2, switches the link of interface A of the PSTN 33-1 to the link 2, in this way, the message of the PSTN 33-1 will be automatically sent to the softswitch 31-2, and the softswitch 31-2 will smoothly take over the service of the softswitch 31-1 for processing.

In this paragraph, the primary softswitch 31 and the standby softswitch 31 refer to softswitches before the primary softswitch 31 falls into an out-of-service state. Upon recovering from out-of-service state, the primary softswitch 31 informs the standby softswitch 31 through a private protocol or a standard protocol, the standby softswitch 31 shuts down all the MTP3 links of the standby signaling point of the local office automatically, then informs the primary softswitch 31, and the primary softswitch 31 activates all the links of the primary signaling point automatically, restores the management of all the links corresponding to the primary signaling point.

The scheme of the embodiment is applicable to the dual-homing networking of the softswitch and the SHLR, the PSTN, the SCP, for example: in the network connecting the softswitch with the SHLR, the MTP3s of the two softswitches can be configured as the same link set in a Signaling Transfer Point (STP) to realize the automatic switching of the signaling link from the SHLR to the softswitch.

In addition, taking the only signaling point into account, another implementation scheme can also be adopted. The specific scheme is:

two softswitches of the dual-homing are acting as two Application Service Points (ASP)s, an MTP3 user adaptation (M3UA) associates to one signaling point of a Signaling Gateway (SG) through an agent or a relay mode, two ASPS are mutually standby. The SG is used to support the M3UA, switch the service of the primary softswitch to the standby softswitch when the primary softswitch is shutdown or is out of service. The SG can be an independent external equipment or embedded in the MGW of the access side, and the M3UA is supported by the independent SG or the SG embedded in the MGW. In the scheme, the signaling of the PSTN is terminated in the SG.

The embodiment is with regard to the dual-homing networking based on the 3G, in the embodiment, the core control equipment is the MSC Server; the peer end network entity is the MGW. Each softswitch in the embodiment has the active and the standby signaling point cross-established which corresponds to the active and the standby link. In normal state, only one signaling point and the corresponding link are used when the softswitch and the MGW communicates with each other.

Figure 4:
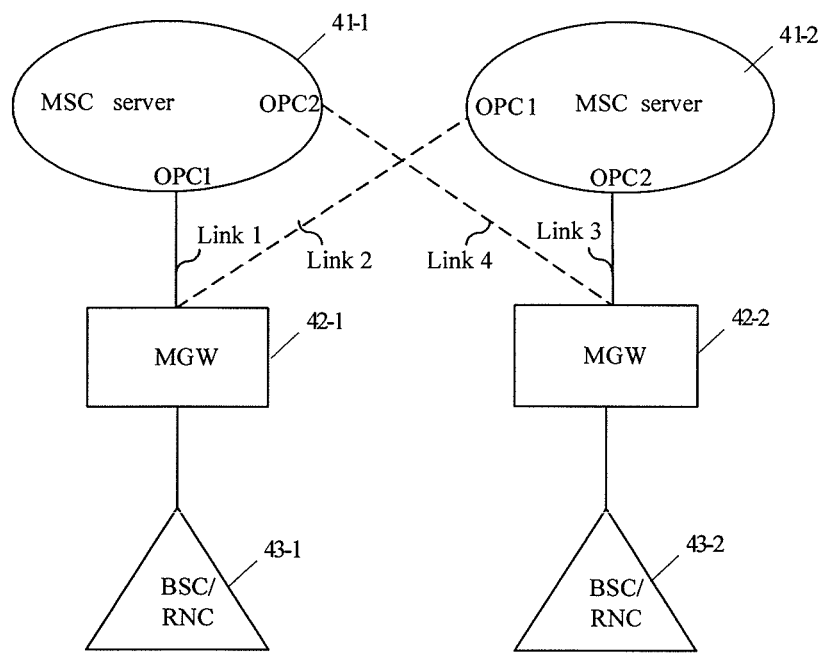
FIG. 4 is a schematic diagram illustrating a dual-homing networking based on a 3G network in accordance with Embodiment two of the present invention.

FIG. 4 is a schematic diagram illustrating the dual-homing networking based on the 3G network in accordance with an embodiment of the present invention, as shown in FIG. 4, the system of the dual-homing networking includes: an MSC Server 41-1 and an MSC Server 41-2, an MGW 42-1 and an MGW 42-2, a BSC/RNC 43-1 and a BSC/RNC 43-2. The MSC Server 41-1 and the MSC Server 41-2 are the dual-homing offices with the relationship of active and standby between each other. Here, "-number" is used to distinguish the equipment with the same function.

It should be noted that, the scheme of the embodiment is also applicable to the networking of an MSC Server with a BSC/RNC, a Home Location Register (HLR), a PSTN, a SCP, an MSC etc., the embodiment only takes the MSC Server and the BSC/RNC network as a example to show the specific implementation of the technical scheme, the specific implementations of other networking are similar with the embodiment.

In FIG. 4, the BSC/RNC 43-1 connects to the MSC Server 41-1 and the MSC Server 41-2 through the MGW 42-1, the BSC/RNC 43-2 connects to the MSC Server 41-1 and the MSC Server 41-2 through the MGW 42-2. The links between the MGW 42 and two MSC Servers 41 with the dual-homing relationship are the load sharing link of one link set, specifically speaking, link 1 and link 2 are in the same link set, link 3 and link 4 are in the same link set, the configuration of the same link set can be implemented on the MGW 42. In order to explain it conveniently, the link between the MGW 42 and the MSC Server 41 which the MGW 42 belongs to is called the primary link, the link between the MGW 42 and the other backing-up MSC Server 41 is called the standby link. It should be noted that, although the link is in the load sharing mode, in the normal state, however, the BSC/RNC only selects the primary link, as shown in FIG. 4, the primary link is indicated with the solid line, and the standby link is indicated with the dashed line.

The primary signaling point OPC1 and the standby signaling point OPC2 are set up in the MSC Server 41-1, and the primary signaling point OPC2 and the standby signaling point OPC1 are also set up in the MSC Server 41-2. It can be seen that the OPC1 is the primary signaling point of the MSC Server 41-1, and the standby signaling point of the MSC Server 41-2; similarly, the OPC2 is the primary signaling point of the MSC Server 41-2, and the standby signaling point of the MSC Server 41-1. In other words, for the MSC Server 41-1, the OPC1 is the only signaling point which the activated BSC/RNC 43-1 detects in the normal state, the OPC2 is the only signaling point which the BSC/RNC 43-2 detects in the standby state; similarly, for the MSC Server 41-2, the OPC2 is the only signaling point which the activated BSC/RNC 43-2 detects in the normal state, the OPC1 is the only signaling point which the BSC/RNC 43-1 detects in the standby state.

The MSC Server 41 is used to carry out the softswitch processing, to detect the state of the MSC Server 41 having the active or standby relationship with it, and to determine whether to activate the MTP3 link of the standby signaling link according to the detected result. For example: when the MSC Server 41-2 detects the MSC Server 41-1 having the active or standby relationship with it is shutdown or is out of service, activates the MTP3 link of the standby signaling point OPC1, that is, the link 2, and switches the link of interface A of the BSC/RNC 43-1 to the link 2. In this way, the message of the BSC/RNC 43-1 will be automatically sent to the MSC Server 41-2, the MSC Server 41-2 will smoothly take over the service of the MSC Server 41-1 for processing. Here, the function and the corresponding configuration of the MGW 42 and BSC/RNC 43 are the same as in the prior art, no detailed description will herein be given.

The scheme of the embodiment is applicable to the processing of the following situations:

In the normal state of the active and standby MSC Servers 41, the dual-homing MSC Server 41 shuts down all the MTP3 links of the local office in the standby state through the management prohibition mode. Specifically speaking, when the MSC Server 41-1 and 41-2 are both in the normal state, the MSC Server 41-1 shuts down the link 2, the MSC Server 41-2 shuts down the link 4, so that the signaling message of the BSC/RNC 43 can be prevented from being sent to two MSC Servers 41 at the same time.

When the active MSC Server 41 is shutdown, the standby MSC Server detects the failure of the peer end, and activates the corresponding MTP3 link of the standby signaling point in the local office. It should be noted that, here the MSC Servers are mutually standby, so the active and standby relation is a relation with reference to specific equipment. Taking the example of the MSC Server 41-1 as the active MSC Server, upon detecting the MSC Server 41-1 is shutdown or out of service, the MSC Server 41-2 activates the MTP3 link of the standby signaling point OPC1 in the local office, that is, the link 2, and switches the link of interface A of the BSC/RNC 43-1 to the link 2. In this way, the message of the BSC/RNC 43-1 will be automatically sent to the MSC Server 41-2, and the MSC Server 41-2 will smoothly take over the service of the MSC Server 41-1 for processing.

In this paragraph, the active MSC Server 41 and the standby MSC Server 41 refer to MSC servers before the active MSC Server 41 falls into an out-of-service state. Upon recovering from the out-of-service state, the active MSC Server 41 informs the standby MSC Server 41 through a private protocol or a standard protocol, the standby MSC Server 41 shuts down all the MTP3 links of the standby signaling point in the local office automatically, then informs the active MSC Server 41, and the active MSC Server 41 actively activates all the links of the primary signaling point of its own, and restores the management of all the links corresponding to the primary signaling point.

The scheme of the embodiment is applicable to the dual-homing networking of the MSC Server and the HLR, the PSTN, the SCP, the MSC, etc. for example: in the network connecting the MSC Server with the HLR, the MTP3s of the two MSC Servers can be configured as one link set in the STP to realize the automatic switching of the signaling link from the HLR to the MSC Server.

In addition, taking the only signaling point into account, another implementation scheme can also be adopted. The specific scheme is:

Two dual-homing MSC Servers are acting as two ASPs, the M3UA associates to one signaling point of the SG through an agent or a relay mode, two ASPs are mutually standby. The SG is used to support the M3UA, switch the service of the active MSC Server to the standby MSC Server when the active MSC Server is shutdown or out of service. The SG can be an independent external equipment of the MSC Server or embedded in the MGW of the access side, and the M3UA is supported by the independent SG or the SG embedded in the MGW. In the scheme, the signaling of the BSC/RNC is terminated in the SG.

The obvious advantages brought by the implementation schemes of Embodiment one and Embodiment two are: the core control equipment with the dual-homing relationship, for example, the softswitches or the MSC Servers, display only one signaling point for the access network, so when a switching takes place between the active and standby equipment, the invalid softswitch or MSC Server and the TDM trunk signaling link resources can be continually utilized, the wasting of trunk signaling link resources which is caused by the dual-homing signaling point can be avoided; and the above-mentioned schemes need to change only the softswitch or the MSC Server slightly, involving no system upgrading, for other equipment, only a minor change of the configuration is needed, so that the reliability of the dual-homing network can be improved with small cost.

Figure 5:
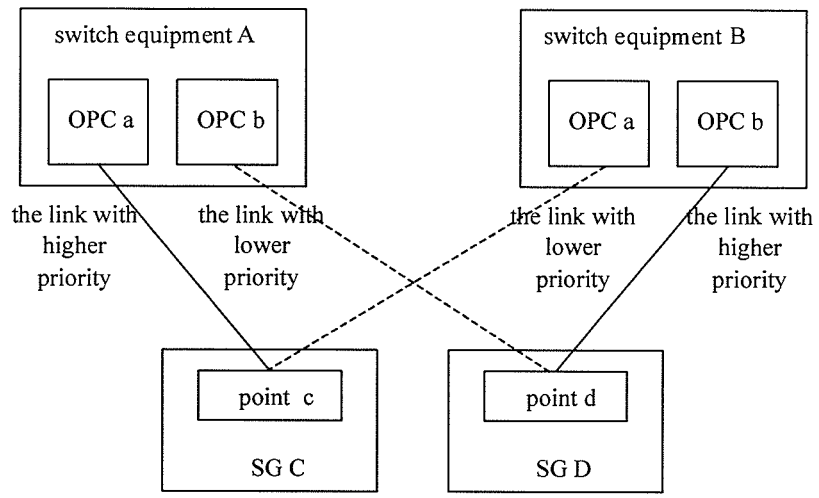
FIG. 5 is a schematic diagram illustrating a networking to implement a SG dual-homing in a NGN network in accordance with Embodiment three of the present invention.
Figure 6:
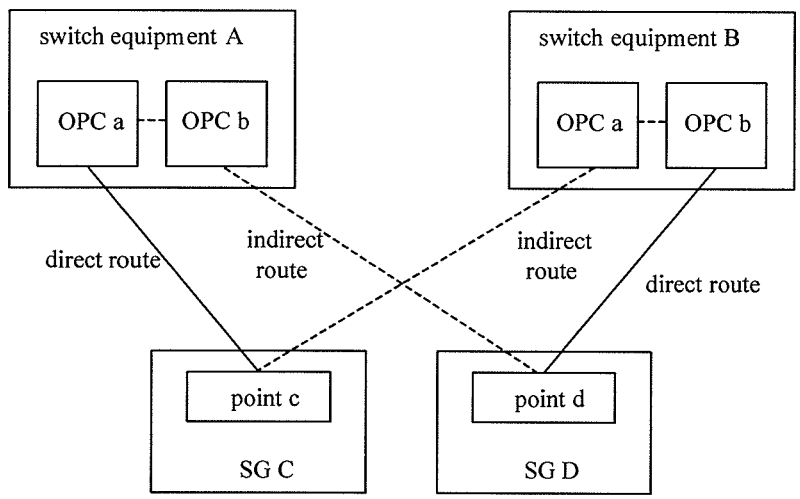
FIG. 6 is a schematic diagram illustrating a networking to implement a SG dual-homing in a NGN network in accordance with Embodiment four of the present invention.

Based on a NGN network, in practical applications, in the case that two core control equipment belong to different networks, respectively, the dual-homing networking between the core control equipment and the SG is shown in FIG. 5 and FIG. 6, and the detailed description is hereinafter given by Embodiment three and Embodiment four, respectively.

In Embodiment three and Embodiment four, the core control equipment are the switch equipment, one is in a softswitch network, the other is in a No. 7 signaling network. The two switch equipment are mutually dual-homing as aid for each other, the SG which has been connected to one of the two switch equipment will be connected to the other in the mutually dual-homing relationship, meanwhile, the active switch equipment and the standby switch equipment of each SG connected with these two switch equipment are set up, respectively. When the two switch equipment work normally, each SG carries out signaling interaction with the active switch equipment which it belongs to, respectively, when certain active switch equipment breaks down, the SG which carries out signaling interaction with the out-of-service switch equipment will switch to the other switch equipment, that is, the standby switch equipment of the switched SG, to continue to carry out the signaling interaction. The reliability of the NGN can be improved by adopting the SG dual-homing method while the utilization rate of the switch equipment is not reduced.

Embodiment Three

FIG. 5 is a schematic diagram illustrating the networking to implement the SG dual-homing in the NGN network in accordance with the embodiment. As shown in FIG. 5, SG C and SG D are connected to switch equipment A and switch equipment B at the same time, respectively, switch equipment A and B are in the dual-homing relation, and switch equipment A is the active switch equipment of SG C and the standby switch equipment of SG D, while switch equipment B is the standby switch equipment of SG C and the active switch equipment of SG D. For convenience, any one of them can be called the first switch equipment, and the other one can be called the second switch equipment. In normal state, signaling point c of SG C interacts by signaling with signaling point a of switch equipment A, and signaling point d of SG D interacts by signaling with signaling point b of switch equipment B. The implementation method of the SG dual-homing in this embodiment is actively as follows:

two OPCs a and b which are independent in logic are configured respectively in switch equipment A and B in the dual-homing relationship, and these two OPCs are in a mutual-aid relation. For convenience, one signaling point can be called the first signaling point, and the other can be called the second signaling point; the connection between signaling point c of SG C and OPC a can be configured as two connections with different priorities: i.e., the link with higher priority between signaling point c and OPC a of switch equipment A is the first connection, as the solid line indicates in the diagram, and the link with lower priority between signaling point c and OPC a of switch equipment B is the second connection, as the dashed line indicates in the diagram;

similarly, the connection between signaling point d of SG D and OPC b can be configured as two connections with different priorities: i.e., the link with higher priority between signaling point d and OPC b of switch equipment B is the first connection, as the solid line indicates in the diagram, and the link with lower priority between signaling point d and OPC b of switch equipment A is the second connection, as the dashed line indicates in the diagram;

the dual-homing from SG C and SG D to switch equipment A and B can be implemented through the configuration mentioned above, and the signaling message transmission is as follows:

For uplink signaling messages, in the normal state, after the uplink signaling messages whose destination signaling point is OPC a arrive at signaling point c of SG C, SG C first determines whether the link with higher priority from signaling point c to OPC a can be used or not, if the higher priority link can be used, which means that switch equipment A works normally, the uplink signaling messages will be sent via the higher priority link to OPC a of switch equipment A for processing; otherwise, i.e., when switch equipment A quits the service because of some reasons, for example, there are some troubles taking place, SG C sends the uplink signaling messages to OPC a of switch equipment B for processing via the lower priority link, thus the dual-homing from SG C to switch equipment A and B can be implemented.

Because the link is the transmission channel of signaling messages, once the switch equipment breaks down, the link cannot receive and send messages, therefore, it is easier for the physical layer or link layer of SG C to detect whether the link breaks down or not, and choose the suitable link to send signaling messages according to the result of the detection.

The implementation method of SG D dual-homing is basically identical with the above-mentioned method, specifically speaking, after the uplink signaling messages whose destination signaling point is OPC b arrive at signaling point d of SG D, SG D chooses the higher priority link to send the uplink signaling messages to OPC b of switch equipment B according to the priority of the links in the link set, if OPC b of switch equipment B is unreachable, then sends the uplink signaling messages to OPC b of switch equipment A via the lower priority link, thus implementing the dual-homing from SG D to switch equipment B and A.

For downlink signaling messages, in the normal state, OPC a of switch equipment A sends the downlink signaling messages to signaling point c of SG C, OPC b of switch equipment B sends the downlink signaling messages to signaling point d of SG D; when any of the switch equipment breaks down, two OPCs of the working switch equipment send the downlink signaling messages to signaling point c of SG C and signaling point d of SG D. For example, when switch equipment A breaks down, OPC a of the switch equipment B carries out the signaling interaction with signaling point c of SG C.

As can be seen from the above, the reliability of the NGN can be greatly improved by the method in the embodiment, and the utilization ratio of the switch equipment can be improved because switch equipment A and B carry out the signaling interaction with SG C and SG D, respectively in the normal state.

To prevent the repeated phenomenon of "simultaneous active" of signaling message from occurring when signaling points a of two switch equipment send the downlink signaling messages to SG C at the same time or signaling points b of two switch equipment send the downlink signaling message to SG D at the same time, if SG C and SG D receive the signaling messages from switch equipment A and B at the same time, the signaling message from the lower priority link will be discarded according to the priority of the links, for example, SG C will discard the signaling message which comes from switch equipment B.

In addition, taking SG C as an example, in the method of this embodiment, when switch equipment A breaks down, although SG C detects that the higher priority link is not available, SG C does not consider OPC a as unreachable, but sends the signaling messages to OPC a of switch equipment B via the lower priority link, therefore, it can be seen that the switching of the SG can be implemented smoothly by adopting the method in the embodiment when the switch equipment breaks down.

Embodiment Four

According to the protocol, the maximal number of links in the configured link set between two signaling points is limited, it is typically 16 links at most, but in the method of this embodiment, the SG needs to configure a redundant link, for example, the link from signaling point c of SG C to OPC a of switch equipment B is the standby link of the link from signaling point c of SG C to OPC a of switch equipment A, in this way, in normal state, the link utilization ratio between the signaling points is relatively low because the redundant links are not used to transmit the signaling message, and, the link quantity may not sufficient when there are many services between signaling point c of SG C and OPC a. To solve the problem, the embodiment puts forward an implementation scheme based on the route priority with regard to the smooth switching of the SG.

FIG. 6 is a schematic diagram illustrating the implementation of the SG dual-homing in the NGN network in accordance with this embodiment. As shown in FIG. 6, SG C and SG D connect to switch equipment A and B at the same time, respectively, switch equipment A and B are in the mutual dual-homing relation, and switch equipment A is the active switch equipment of SG C, and the standby switch equipment of SG D, while switch equipment B is the standby switch equipment of SG C, and the active switch equipment of SG D. For convenience, one of the switch equipment can be called as the first switch equipment, and the other can be called the second switch equipment. In the normal state, signaling point c of SG C interacts by signaling with OPC a of switch equipment A, and signaling point d of SG D interacts by signaling with OPC b of switch equipment B. The implementation method of the SG dual-homing of this embodiment is actively as follows:

two OPCs a and b which are independent in logic can be configured in switch equipment A and B in the mutual dual-homing relationship, respectively, and these two OPCs are in the mutual-aid relation. For convenience, one signaling point can be called the first signaling point, and the other can be called the second signaling point;

two connections between signaling point c of SG C and OPC a can be configured with different priorities: the direct route with higher priority between signaling point c and OPC a of switch equipment A is the first connection, as the solid line indicates in the diagram, and the indirect route with lower priority from signaling point c to OPC a of switch equipment B via OPC b of switch equipment B is the second connection, as the dashed line indicates in the diagram. Here, OPC b is regarded as the STP;

similarly, two connections between signaling point d of SG D and OPC b can be configured with different priorities: the direct route with higher priority between signaling point d and OPC b of switch equipment B is the first connection, as the solid line indicates in the diagram, and the indirect route with lower priority from signaling point d to OPC b of switch equipment A via OPC a of switch equipment A is the second connection, as the dashed line indicates in the diagram. Here, OPC a is also regarded as the STP.

Figure 7:
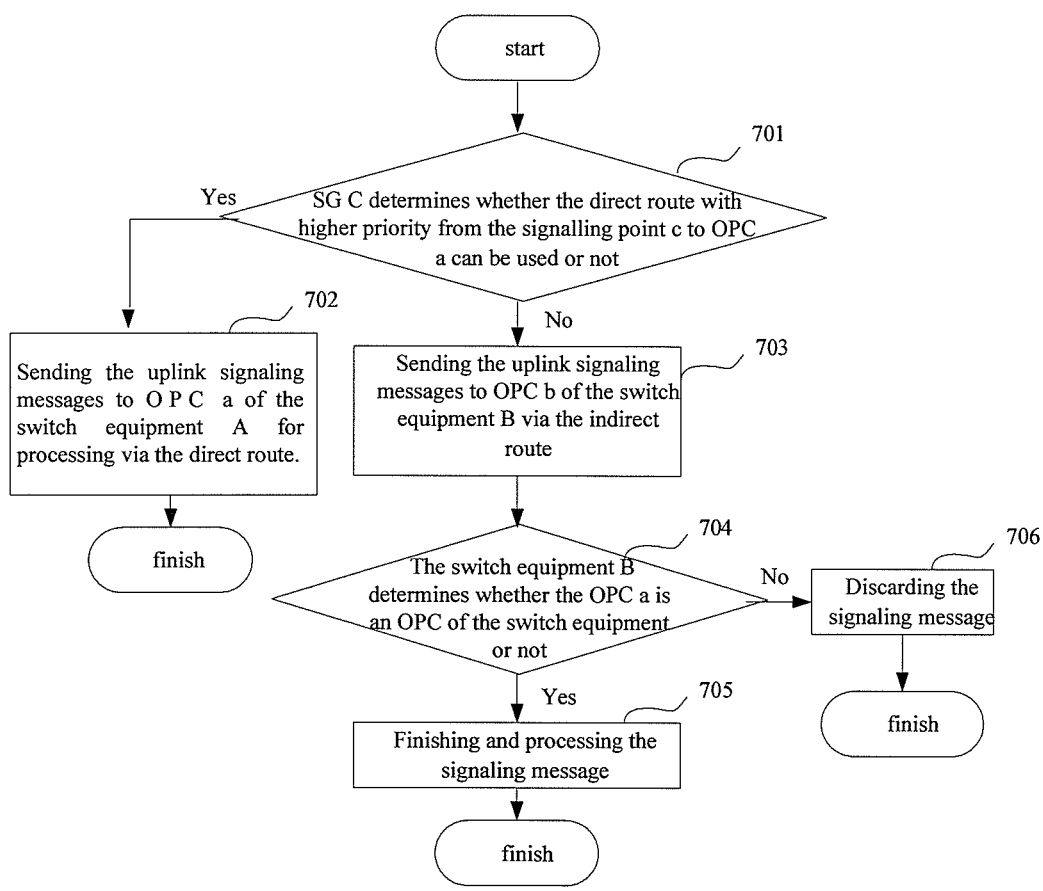
FIG. 7 is a flow chart illustrating a method to implement a SG dual-homing base on the route priority in FIG. 6.

The dual-homing of SG C and SG D can be implemented by the configuration mentioned above, and for the uplink signaling messages, the process of the signaling message transmission is as shown in FIG. 7.

Steps 701.about.703: When the uplink signaling messages whose destination signaling point is OPC a arrive at signaling point c of SG C, the SG C first detects whether the direct route with higher priority from signaling point c to OPC a can be used or not.

If the direct route with higher priority in the link set can be used, which means switch equipment A works normally, proceed to Step 702, and the uplink signaling messages are sent to OPC a of switch equipment A for processing via the direct route with higher priority, then the procedure is terminated;

otherwise, which means switch equipment A quits the service for some reasons, for example, there are some troubles taking place, proceed to Step 703, the uplink signaling messages are sent to OPC b of switch equipment B through the link between SG C and switch equipment B via the indirect route with lower priority, and then proceed to Step 704;

Steps 704.about.706: Switch equipment B determines whether OPC a is the OPC of the switch equipment or not according to the configured OPC, if OPC a is the OPC of the switch equipment B, proceed to Step 705, OPC b forwards the signaling messages to OPC a, OPC a terminates and processes the signaling messages, where the function of the OPC is the same as that of the STP, and then the procedure is terminated; otherwise, proceed to Step 706, the signaling messages are discarded, and then the procedure is terminated.

For the downlink signaling messages, when switch equipment A quits the service, if OPC a of switch equipment B needs to send the signaling messages to other switch equipment through SG C, because no link exists between OPC a of switch equipment B and signaling point c of SG C, switch equipment B first needs to determine whether the link between OPC b of switch equipment B which is in the mutual-aid relationship with OPC a of switch equipment B and signaling point c of SG C can be used or not, if the link between OPC b of switch equipment B and signaling point c of SG C can be used, then the signaling messages are sent to SG C through the link between OPC b and signaling point c of SG C, and then SG C forwards the messages. At this time, the function of OPC b is still the same as that of the STP; if the link between OPC b of switch equipment B and signaling point c of SG C cannot be used, then the downlink signaling messages cannot be sent out.

The route will break down if all the links in the link set between two signaling points break down, therefore, when switch equipment A breaks down, SG C will immediately detect that the direct route from signaling point c of SG C to OPC a cannot be used.

The implementation method of SG D dual-homing is basically identical with above-mentioned method, and no description in detail will be given again.

Similarly, to prevent the repeated phenomenon of signaling messages "simultaneous active" from occurring, when two signaling points a of two switch equipment send the downlink signaling messages to SG C at the same time or two signaling points b of two switch equipment send the downlink signaling messages to SG C at the same time, when the SG receives the signaling messages from switch equipment A and B at the same time, the signaling messages from the lower priority route will be discarded according to the priority of the route, for example, SG C will discard the signaling messages which comes from switch equipment B.

In addition, taking SG C as an example, in the method of the embodiment, when switch equipment A breaks down, although SG C detects that the direct route with higher priority is not available, SG C does not consider OPC a as unreachable, but sends the signaling messages to switch equipment B via the lower priority route, therefore, by adopting the method in this embodiment, the smooth switching of the SG can be implemented when the switch equipment breaks down.

As can be seen from the above, the method of this embodiment has the same advantages as embodiment three, on one hand, the utilization ratio of the switch equipment can be improved while raising the reliability of the NGN; on the other hand, the smooth switching of SG is implemented. In addition, because the method of this embodiment does not require set redundant link between the switch equipment and the signaling point of the SG, the utilization ratio of the links is raised, and the processing capacity of signaling is effectively ensured when service flow is large in the NGN.

Taking SG C as an example to describe the advantages of Embodiment four in detail. As can be seen from above-mentioned method, two routes between signaling point c of SG C and OPC a in the method of Embodiment Four are configured: the direct route and the indirect route, where the indirect route occupies, in fact, only the link between signaling point c of SG C and OPC b of switch equipment B, and does not occupy the link between signaling point c of SG C and OPC a of switch equipment A or B, therefore, in the normal state, the link between signaling point c of SG C and OPC a of switch equipment A can be configured with full capacity to satisfy the service demand to the largest extent. In addition, in the normal state, no signaling interaction between signaling point c of SG C and OPC b of switch equipment B is carried out, usually signaling point d of SG D carries out the signaling interaction with OPC b of switch equipment B, therefore, when switch equipment A breaks down, SG C transmits the signaling message via the indirect route, so that no other service will be influenced by the occupied link of the signaling message. Meanwhile, because the link between signaling point c of SG C and OPC b of switch equipment B can also be configured with full capacity, the service of its own will not be influenced.

Regarding the problem of how to trigger the switching between the dual-homing equipment in time, taking the MGW as an example, the basic idea of the invention is: the MGW and the core control equipment detect in real time whether the MGW needs to register again, furthermore, a heartbeat mechanism can also be set up between the MGW and the core control equipment. Therefore, the switching can be triggered by the core control equipment, for example, the switching can be triggered by the MGW as well if only a certain link breaks down; if the interface between a core control equipment and an MGW breaks down or a certain core control equipment breaks down, the MGW can initiate the switching according to a detection of interrupted heartbeat.

Figure 9:
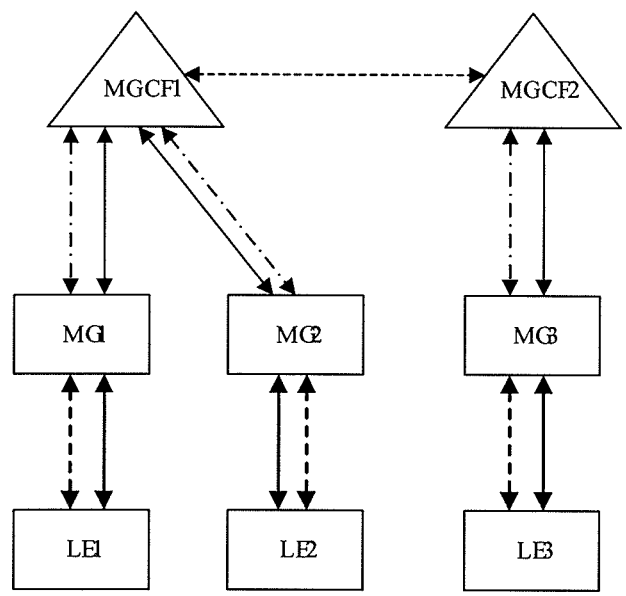
FIG. 9 is a diagram illustrating the networking state before a failure occurs in a preferred embodiment of the present invention.
Figure 10:
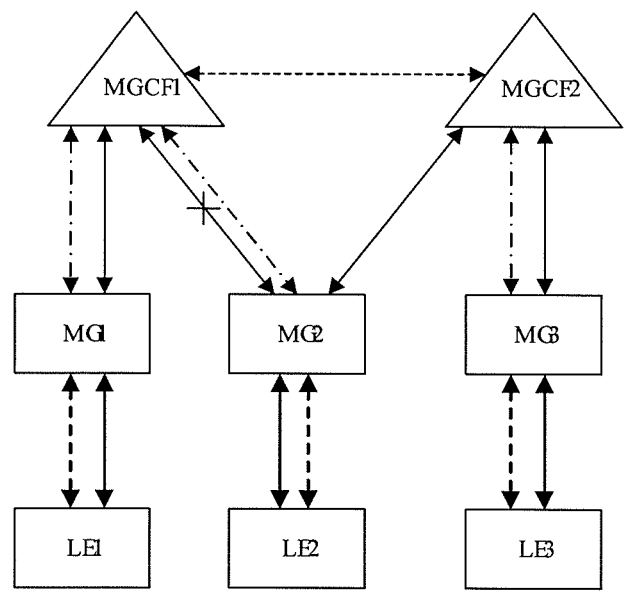
FIG. 10 is a diagram illustrating the networking state when the MGW registers to a standby Media Gateway Control Function (MGCF) after the MC interface broke down in the preferred embodiment as shown in FIG. 9.
Figure 11:
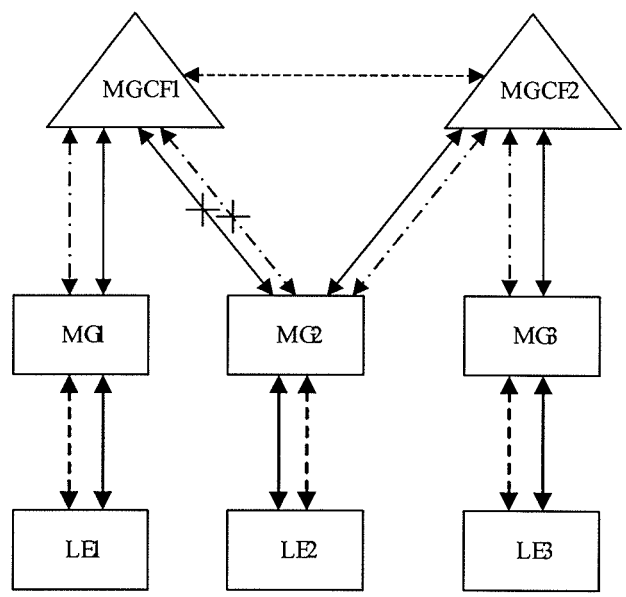
FIG. 11 is a diagram illustrating the networking state upon finishing the dual-homing switching in accordance with the preferred embodiment of the present invention as shown in FIG. 9.

In the NGN with separated control and bearer, FIG. 9 to FIG. 11 are schematic diagrams illustrating the switching process of the dual-homing equipment MG, where the core control equipment is the MGCF entity, MGCF1 and MGCF2 are two MGCF entities in the mutual standby relation, MG1, MG2 and MG3 are three MGWs, LE1, LE2 and LE3 are three Local Exchange (LE) networks. MGCF1 is connected with MGCF2 through the signaling between the MGCF, as the thin dashed line in the diagram indicates; MG1 and MG2 are connected with MGCF1 through a User Adaptation (UA) signaling and the MC interface, MG3 is connected with MGCF2 through the UA signaling and the MC interface, which is indicated with the thin solid line in the diagram, and the UA signaling is indicated with the dot dash line; MG1 is connected with LE1 through a narrowband signaling and a trunk bearer connection, MG2 is connected with LE2 through the narrowband signaling and the trunk bearer connection, MG3 is connected with LE3 through the narrowband signaling and the trunk bearer connection. In the diagram, the thick solid line indicates the trunk bearer, and the thick dashed line indicates the narrowband signaling.

The narrowband signaling is usually transmitted to the MGCF through the corresponding UA signaling, for example No. 7 signaling (SS7), or through a message transmit part 2 user adaptation (M2UA) or a message transmit part 3 user adaptation (M3UA). When it is through the UA signaling that the narrowband signaling is sent to the MGCF, the narrowband signaling is usually sent through the SG equipment to the MGCF. In FIG. 9 to FIG. 11, the SG equipment is embedded in the MG while in other embodiments, the SG can be put independently.

Figure 8:
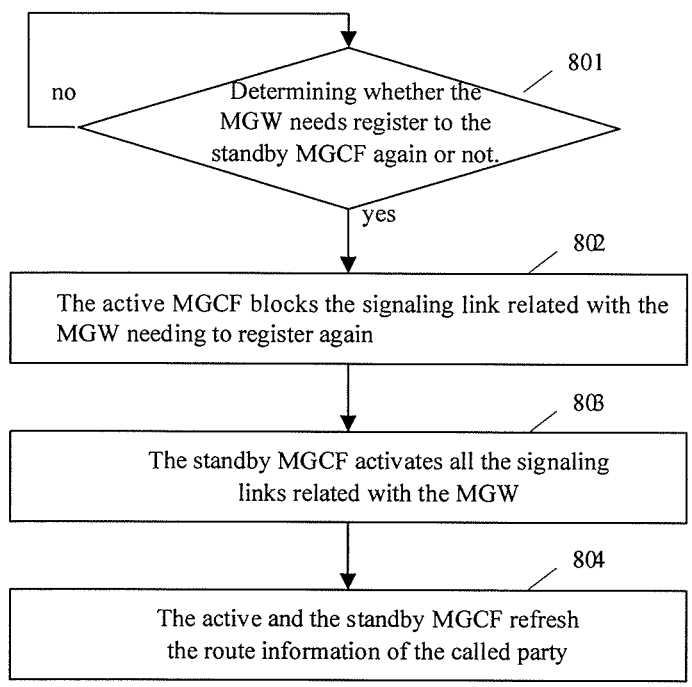
FIG. 8 is a flow chart illustrating a method to implement a dual-homing in accordance with a preferred embodiment of the present invention.

The switching process of the MGCF is shown in FIG. 8, and the networking state before the network breaks down is shown in FIG. 9. Here, supposing that MGCF1 is the primary MGCF and MGCF2 is the standby MGCF, the switching includes the following steps:

Step 801: Determining whether the MGW needs register to the standby MGCF again, if the MGW needs register again to the standby MGCF, proceed to the follow steps; otherwise, return to Step 801 to continue monitoring.

There are two conditions for the MGW to register to the standby MGCF again: Condition 1: Upon detecting that the link of the MC interface breaks down, the MGW can register to the standby MGCF automatically. As shown in FIG. 10, the MC interface from MG2 to MGCF1 breaks down, which is indicated by "X", then MG2 needs to register to MGCF2 again.

Obviously, if the primary MGCF breaks down, for example, the primary MGCF system is out-of-service, the MGW may as well consider the MC interface as failed, thus the registering to the standby MGCF is triggered. In this case, it is not needed to carry out the steps related with the primary MGCF, specifically speaking, it is not needed to carry out Step 802 and the operations that the primary MGCF carries out in Step 804.

Condition 2: the MGW receives the command that the primary MGCF requires it to register to the standby MGCF.

Step 802: If the primary MGCF works normally, then the primary MGCF shuts down the signaling links related with the MGW requiring to register again. Here, assuming that the primary MGCF is in the normal state.

Under the above-mentioned condition 1, if the primary MGCF detects that the MC interface breaks down, the primary MGCF may actively shut down all the signaling links related with the MGW requiring to register again.

Under the above-mentioned condition 2, if the primary MGCF requires the MGW to register to the standby MGCF, the primary MGCF actively shuts down all the signaling links related with the MGW requiring to register again.

There are two methods for the MGCF to shut down the signaling links related with the MGW requiring to register again:

the first shutting down method: For the link forwarded to the MGCF from such equipment as the MGW or the SG, for example, a link of M2UA, M3UA, link access protocol Version 5 User Adaptation (V5UA), Integrated services digital network Q.921 User Adaptation (IUA), Radio Access Network Application Part (RANAP), or Base Station Application Part (BSAP), when the MC interface of a gateway is not controlled by the MGCF which the MC belongs to, the MGCF actively shuts down or blocks the links connected with the Stream Control Transmission Protocol (SCTP) of the gateway.

The second shutting down method: for such inter-office signaling as that of a Bearer Independent Call Control (BICC) and a Session Initiation Protocol (SIP) type, the MGCF is directly interfaced with the outside, rather than through the MGW or the SG. When the MC interface of a gateway is not controlled by the MGCF which it belongs to, the MGCF actively shuts down or blocks the signaling links related with the gateway as well.

Here, the signaling links related with the MGW refer to the links through which the signaling related with the voice channel resources of a specific MGW are transmitted for example: an Initial Address Message (IAM) will occupy the trunk resources of an MGW, so the signaling is related with the MGW, and the link transmitting the signaling is the signaling link related with the MGW resources. The characteristic of these links is that the signaling which they transmit is only related with the voice channel of the MGW. For example, the voice channel and signaling of LE2 can reach MG1 in FIG. 9, and whenever requiring to communicate with MG1, LE2 will interact with the MGCF through this narrowband signaling.

Step 803: If the standby MGCF is normal, when a new MGW is detected to make registration, all the signaling links related with the MGW will be activated actively. Here, assuming that the standby MGCF is normal.

In essence, so long as one MGW succeeds in registration to an MGCF, the MGCF takes over the signaling related with the MGW.

There are also two methods for the MGCF to activate the signaling links related with the MGW.

The first activating method: for the link forwarded to the MGCF from other equipment, such as the MGW or the SG, for example a link of any of the M2UA, the M3UA, the V5UA, the IUA, etc., after the MC interface of a new gateway succeeds in registration, the MGW is controlled by the MGCF to which the MGW has newly registered, the MGCF activates or initiates the link connected with the SCTP of the gateway automatically.

The second activating method: for such inter-office signaling as that of the BICC or SIP type, the MGCF is directly interfaced with the outside, rather than through the MGW or the SG. After the MC interface of the gateway succeeds in registration, the MGCF actively opens the signaling links related with the gateway as well.

FIG. 10 is a networking state after executing Step 802. FIG. 11 is a networking state after executing Step 803. When MGCF1 detects the MC interface of MG2 breaks down, MGCF1 shuts down the UA signaling link from MG2 to itself, MGCF2 detects that MG2 has registered to itself, and then activates the signaling links related with MG2.

Step 804: The active and standby MGCFs refresh the route information of the called party.

When some MGWs of the primary MGCF register to the standby MGCF, the call originally between different MGWs of the primary MGCF will be turned into the inter-office call between the primary MGCF and the standby MGCF, and the inter-office call between other MGWs and the new registered MGW in the standby MGCF will be turned into the intra-office call, so the route information of the called party needs to be refreshed.

Specifically speaking, the primary MGCF changes the intra-office call in the route information of the called party to the inter-office call, in which the changed intra-office call is related with the MGW having registered to the standby MGCF again, the standby MGCF changes the inter-office call in the route information of the called party to the intra-office call, in which the inter-office call is between other MGWs of the standby MGCF and the newly registered MGW. Taking FIG. 11 as an example, MGCF1 changes the intra-office call related with MG2 in the route information of the called party to the inter-office call, that is, the call between MG1 and MG2 is changed to the inter-office call; and MGCF2 changes the inter-office call between MG2 and MG3 in the route information of the called party to the intra-office call.

In practical applications, the physical entity which the MGCF corresponds to is a Media Gateway controller (MGC). In order to guarantee that the MGW can be switched to another MGC in time if the MGC which the MGW belongs to breaks down, the invention also offers a scheme of adding a heartbeat mechanism between the MGW and the MGC which the MGW belongs to. So long as the MGW detects a heartbeat interruption, it means that the MGC which the MGW belongs to has broken down or the link related with the home MGC has broken down, then the MGW initiates the switching, and registers to another MGC again.

Embodiment Five

Figure 12:
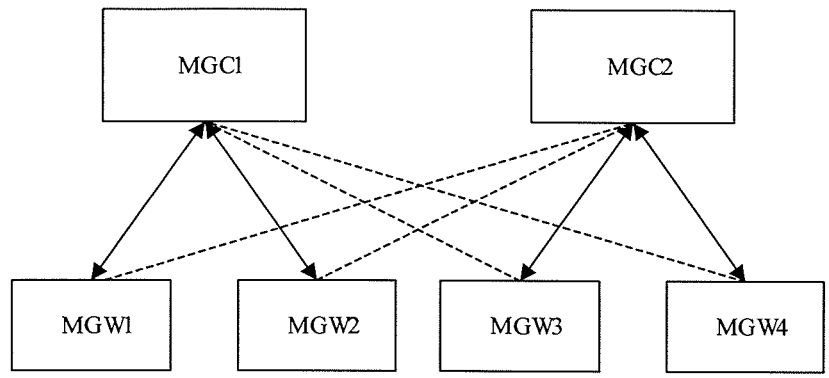
FIG. 12 is a schematic diagram illustrating the network structure to implement the MGW dual-homing in accordance with Embodiment five of the present invention.

In this embodiment, configuring one or multiple MGWs in advance for each MGC in the network, and the MGW is managed by the MGC, meanwhile, configuring two MGCs as mutually standby, and the two MGCs with the standby relation are called the mutual-aid MGC for each other. As shown in FIG. 12, MGW1 and MGW2 are managed by MGC1, MGW3 and MGW4 are managed by MGC2, MGC1 and MGC2 are the mutual-aid MGC for each other.

For brevity and convenience, the MGW managed by the MGC is called the primary MGW of the MGC, and the MGW managed by the mutual-aid MGC of the MGC mentioned above is called the standby MGW of the MGC. Refer to FIG. 12, MGW1 and MGW2 are the primary MGW of MGC1 and the standby MGW of MGC2 while MGW3 and MGW4 are the primary MGWs of MGC2 and the standby MGWs of MGC1. It is understood here that the primary MGW and standby MGW are a concept with reference to specific MGC. The link connecting each MGC with its primary MGW is called the primary link, just as the double arrow solid line between the MGC and the MGW shown in FIG. 12; the link connecting each MGC with its standby MGW is called the standby link, just as the dotted line between the MGC and the MGW shown in FIG. 12.

When the configuration of the MGC is finished, the information about the active and standby MGW configured for each MGC is stored in the database of a system network management centre for the MGC to inquiry.

Besides, in accordance with the method of this embodiment, a primary MGC and a standby MGC for each MGW are configured in the network in advance. The primary MGC is the MGC that manages the MGW, and the standby MGC is the mutual-aid MGC of the primary MGC controlling the MGW. Refer to FIG. 12, the primary MGC of MGW1 and MGW2 is MGC1, the standby MGC thereof is MGC2 while the primary MGC of MGW3 and MGW4 is MGC2, and the standby MGC thereof is MGC1. Here, the primary MGC and standby MGC are with reference to specific MGW.

Upon finishing the above-mentioned configurations for the MGW, the information about the active and standby MGC of each MGW is saved in the database in the MGW itself.

In the normal state, the MGW will belong to its primary MGC, when the primary MGC breaks down, the MGW switches to its standby MGC, and belong to its standby MGC. According to the method of this embodiment, the MGW detects the working state of the MGC which it belongs to through the heartbeat mechanism between the MGW and the MGC which it belongs to so as to determine whether it is needed to carry out switching.

As can be seen from the above description, there are two states when an MGC works normally. If its mutual-aid MGC also works normally, the state in which the MGC controls only its own primary MGW is called a mutual-aid non-activated state; if its mutual-aid MGC breaks down, the state in which the MGC controls its own active and standby MGWs at the same time is called the mutual-aid activated state.

According to the method of this embodiment, the MGC can detect the working state of the mutual-aid MGC through the heartbeat mechanism between the MGCs, and actively carry out a state-transition between the above-mentioned two states according to the working state of the mutual-aid MGC; the MGC also can carry out the state-transition between the above-mentioned two states passively according to the control command for the state change that the system network management centre issues.

A further description with reference to preferred examples is as follows.

Example 1

Taking the Different Working States of MGC1 in FIG. 12 as an Example

1) Supposing MGC1 and MGC2 are in normal working state, under such circumstances, MGC1 and MGC2 are in the mutual-aid non-activated state, MGC1 will execute the following operations in parallel:

a1, maintaining the established primary link connecting it with its primary MGW, and accomplishing the control for the primary MGW through the primary link;

a2, responding the heartbeat signal that the primary MGW sends periodically through the primary link, that is, sending the heartbeat signal to the primary MGW periodically, to notify the primary MGW that MGC1 operates normally;

a3, maintaining its own MGW list;

It should be noted that each MGC needs to set up an MGW list during the process of initialization, the list is used for recording all the information about the MGW which is controlled by the MGC. Each MGC determines whether to accept the register request from the MGW or not according to its own MGW list. In the normal state, each MGC can maintain its own MGW list through reading the database of the system network management centre.

a4, processing the register request from the MGW according to the MGW list maintained by itself, that is, if the MGW that reports the register request appears in the MGW list maintained by the MGC, the MGC accepts the register request from the MGW, otherwise, the MGC refusing the register request from the MGW;

a5, sending the heartbeat signal to the MGC with the mutual-aid relationship periodically to notify the mutual-aid MGC that MGC1 works normally;

a6, monitoring the heartbeat signal sends by the mutual-aid MGC, detecting the working state of the mutual-aid MGC in real time.

As shown in FIG. 12, under the above-mentioned circumstances, MGW1 and MGW2 belong to MGC1, and communicate the control command with MGC1 while MGW3 and MGW4 belong to MGC2, and communicate the control command with MGC2. At the same time, MGW1 and MGW2 need to send the heartbeat signal to MGC1 periodically through their own primary link, and confirm whether the MGC1 and its own primary link work normally or not through receiving the heartbeat signal returned from MGC1. MGW3 and MGW4 need to send the heartbeat signal to MGC2 periodically through their own primary link, and confirm whether the MGC2 and its own primary link work normally or not through receiving the heartbeat signal returned from MGC2. MGC1 and MGC2 determine the working state of each other through the heartbeat signal from the other side.

2) MGC1 breaks down, and MGC2 is in the normal working state: in this case, because MGC1 breaks down, MGC1 will be unable to send the heartbeat signal to MGC2 and the primary MGWs of MGC1, that is, MGW1 and MGW2. So, MGW1, MGW2 and MGC2 can determine that MGC1 breaks down through the interrupted period of the heartbeat signal.

When MGW1 and MGW2 detect the interrupted period of the heartbeat signal that MGC1 sends reaches a preset threshold for the detection of the broken heartbeat signal, and determine that MGC1 has broken down, these two MGWs will send the register requests actively to the configured standby MGC, that is, MGC2, and wait for MGC2 to set up the standby link to continue the control command interaction.

When MGC2 detects the interrupt times of the heartbeat signal that MGC1 sends reaches the preset threshold for the detection of the broken heartbeat signal, MGC2 determines that MGC1 has broken down. At this moment, MGC2 will shift from the mutual-aid non-activated state to the mutual-aid activated state, read the configuration data of the MGW again from the database of the system network management centre during the process of shifting the state, put its own standby MGWs, that is, MGW1 and MGW2, in the MGW list maintained by itself, and refresh the MGW list. In this way, MGC2 can process the register requests that MGW1 and MGW2 report.

Upon finishing the refresh of the MGW list, MGC2 shifts to the mutual-aid activated state. Upon receiving the register requests that the standby MGWs, that is, MGW1 and MGW2, report, MGC2 in the mutual-aid activated state determines whether to accept the register request or not according to the MGW list maintained by itself, and sets up the standby link upon accepting the register requests, and then carries out control on MGW1 and MGW2 through the standby links. At this moment, MGW1 and MGW2 belong to MGC2.

At this time, MGC2 in the mutual-aid activated state, apart from carrying out the operations of the above-mentioned steps a1-a6, carries out the control command interaction with the standby MGWs, that is, MGW1 and MGW2, through the standby links, and returns the heartbeat signals to MGW1 and MGW2 periodically to notify MGW1 and MGW2 that MGC2 works normally.

In practical applications, upon finishing the refresh of the MGW list, MGC2 sets up the standby links directly rather than waits for MGW1 and MGW2 to report the register request, and initiates the switching from MGC1 to MGC2 for MGW1 and MGW2 actively.

In addition, after MGW1 and MGW2 switch from MGC1 to MGC2, MGW1 and MGW2 will perform control command interaction with MGC2 through the standby links, send the heartbeat signal to MGC2 periodically at the same time, and confirm whether MGC2 and the standby links work normally by receiving the heartbeat signal returned from MGC2.

It is understood by those skilled in the art that, if MGC1 works normally and MGC2 breaks down, MGW3 and MGW4 can switch from MGC2 to MGC1 through the above-mentioned operation as well.

3) MGC1 recovers from the out-of-service state:

Upon recovering from the out-of-service state, restarting and initializing the system, MGC1 will first detect the heartbeat signal coming from MGC2, so as to choose the working state to which MGC1 will shift upon recovering from the out-of-service state.

Situation one: MGC1 will shift to the mutual-aid non-activated state if the heartbeat signal from MGC2 can be detected. Before shifting to the mutual-aid non-activated state, MGC1 will read the configuration data of the MGW from the database of the system network management centre, add its primary MGWs, that is, MGW1 and MGW2, to the MGW list controlled by itself, and finish the refresh of the MGW list. Thus the MGC can process the register information that MGW1 and MGW2 report.

Upon shifting to the mutual-aid non-activated state, MGC1 waits for the register request of MGW1 and MGW2, and prepares to set up the primary links. At the same time, MGC1 sends the heartbeat signal to MGC2 again to notify MGC2 that MGC1 has recovered from the out-of-service state at present.

Upon detecting the heartbeat signal sent from MGC1, MGC2 will shift to the mutual-aid non-activated state from the mutual-aid activated state. Before shifting to the mutual-aid non-activated state, MGC2 will execute the following steps in order:

b1, searching thoroughly the MGW list maintained by the MGC, obtaining the standby MGWs from the MGW list through inquiring the database of the system network management centre;

b2, sending a message indicating withdrawal of the service to the found standby MGWs, informing the standby MGWs that the MGC no longer provides the service, making the standby MGWs remove the standby links immediately;

Through the performance of this step, when determining to quit serving, MGC2 can notify its standby MGWs immediately, that is, MGW1 and MGW2, through the messages indicating withdrawal of the service, therefore, MGW1 and MGW2 can obtain in time that MGC2 will quit serving, and can report register requests to the other MGC in time, thus accelerating the switching between MGWs;

Alternatively, the function of Step b2 can also be realized by adopting the heartbeat mechanism between MGC2, MGW1 and MGW2, that is, after carrying out Step b1, MGC2 stops returning the heartbeat signals to MGW1 and MGW2 to notify MGW1 and MGW2 that MGC2 no longer serves. In this way, MGW1 and MGW2 can determine that MGC2 has quit serving through the interrupt times of the heartbeat signal. But, compared with the method in Step b2, this method has the disadvantage of consuming more time.

b3, shutting down the communication ports connected with its standby MGWs, and tearing down the standby links;

This step prevents the wrong operation that the standby MGWs of MGC2 report register requests to MGC2 upon receiving the message indicating withdrawal of the service and MGC2 accepts the register requests again;

In addition, in order to guarantee that MGC2 can successfully send the messages indicating withdrawal of the service to its standby MGWs, after executing Step b2, it is better for the Step b3 to be executed after a while;

b4, deleting all the standby MGW information from the MGW list to guarantee that, even if the standby links have not been removed successfully, MGC2 can refuse the register requests that the standby MGWs report by determining that the standby MGWs are not among the MGWs which are controlled by MGC2 according to the MGW list after deleting the standby MGWs information.

Upon receiving the messages indicating withdrawal of the service from MGC2, the standby MGWs of MGC2, that is, the primary MGWs of MGC1, MGW1 and MGW2, will remove the standby links connected with MGC2, and send the register requests to MGC1.

Upon receiving the register requests from MGW1 and MGW2, MGC1 will determine whether to accept the register requests that the MGWs report according to the MGW list maintained by MGC1 itself, and upon accepting the register requests, sets up the primary links, and completes the switching from MGC2 to MGC1 for MGW1 and MGW2. At this time, MGW1 and MGW2 belong to MGC1.

In practical applications, upon shifting to the mutual-aid non-activated state, MGC1 can set up the primary links directly instead of waiting for the primary MGWs to report register requests, and actively initiate the switching from MGC2 to MGC1 for its primary MGWs.

After the primary MGWs of MGC1 have shifted to MGC1 from MGC2, MGC1 and MGC2 are both in the mutual-aid non-activated state, so the operations that a1-a6 describe can be executed by MGC1 and MGC2, respectively, to realize the control on its own primary MGWs and the state notification to the mutual-aid MGC.

Situation two: If MGC1 detects no heartbeat signal from MGC2 upon recovering from the out-of-service state, which means that MGC2 breaks down at the moment, then MGC1 will shift to the mutual-aid activated state. Before shifting to the mutual-aid activated state, MGC1 will first read the configuration data of the MGW from the database of system network management centre, add its primary MGWs, MGW1, MGW2, and standby MGWs, MGW3 and MGW4, to the MGW list controlled by itself, and finish the refresh of the MGW list. Thus MGC1 can process the register requests that its active and standby MGWs report.

Upon shifting to the mutual-aid activated state, MGC1 will wait for the register requests from its active or standby MGWs, MGW1, MGW2, MGW3 or MGW4, prepare to set up the primary links or standby links. Upon receiving the register request that MGW1, MGW2, MGW3 or MGW4 reports, MGC1 will accept the register request and set up the primary link or the standby link, to resume the control on MGW1, MGW2, MGW3 or MGW4.

In practical applications, upon shifting to the mutual-aid activated state, MGC1 can set up the primary links or the standby links directly instead of waiting for the register request from MGW1, MGW2, MGW3 or MGW4.

MGC1 with the mutual-aid activated state, apart from executing the above-mentioned operations that are described in a1-a6 to control its primary MGWs, performs the control command interactions with MGW3 and MGW4 through the standby links, and returns the heartbeat signals to MGW3 and MGW4 periodically to notify MGW3 and MGW4 that MGC1 works normally at present.

During the process of MGC passively shifting between the mutual-aid non-activated state and the mutual-aid activated state according to the state shifting command from the system network management center, the operations executed by MGC1, MGC2 and MGW1, MGW2, MGW3, MGW4 are the same as the operations executed by MGC1, MGC2, MGW1, MGW2, MGW3 and MGW4 in the three cases of the above-mentioned Example 1, and no further description is herein given.

It can be found from the above-mentioned implementation method of MGW dual-homing that the method guarantees, when certain MGC breaks down or accidentally shutdowns, the MGW which belongs to the out-of-service MGC can realize the switching to the other MGC through adding the heartbeat mechanism between the MGW and the MGC which the MGW belongs to, thus effectively avoiding the problem in the prior art.

Example 2

It can be found from the method of Example 1 that, when MGC1 recovers from the out-of-service state, it will enter the mutual-aid activated state or the mutual-aid non-activated state directly, attempting to activate the control on its primary MGWs. But, because the primary MGWs of MGC1 are controlled by MGC2 at that moment and the service flows may be very big, a large amount of call loss will be inevitably caused if switching of the MGW dual-homing is made at that moment.

To solve the problem of call loss, this example has improved the method of Example 1 by adding an idle state under mutual-aid condition to the existing working state of the MGC. The idle state under mutual-aid condition refers to a state in which the MGC is unable to control any MGW, whether the primary MGWs or the standby MGWs.

The method of this example further makes the MGC, enter only the idle state under mutual-aid condition upon restarting and initializing, rather than enter the mutual-aid activated state or the mutual-aid non-activated state directly. And, the MGC in the idle state under mutual-aid condition can switch from the idle state under mutual-aid condition to the mutual-aid activated state or the mutual-aid non-activated state according to the signal of the state change from the system network management centre.

At this time, the system network management centre can choose a suitable opportunity of the switching according to the traffic volume interacted between the primary MGWs of the MGC in the idle state under mutual-aid condition and the MGC that the MGWs now belong to. When the traffic volume is small, the system network management centre issues the control command of the state change to the MGC in the idle state under mutual-aid condition, making it initiate the switching from the idle state under mutual-aid condition to the mutual-aid non-activated state or the mutual-aid activated state. Before shifting to the mutual-aid activated state, the MGC will execute the operations that MGC1 executes when recovering from the out-of-service state in Example 1 to realize the switching of the MGW.

Refer to FIG. 12, in this example, MGC1 will enter the idle state under mutual-aid condition directly when recovering from the out-of-service state, the system network management centre will detect the traffic volume between MGC2 and the primary MGWs of MGC1, MGW1 and MGW2. When the traffic volume is small, MGC1 is made to shift from the idle state under mutual-aid condition to the mutual-aid non-activated state or the mutual-aid activated state to take over its primary MGWs again.

As can be seen from the above, by making the MGC firstly enter the idle state under mutual-aid condition after the restarting and initialization of the MGC, and carry out a state shift according to the control command of the state change from the system network management centre, when the traffic volume between the MGWs of which the state will be shifted soon and the MGC which the MGW then belongs to is small, the method can avoid call loss effectively.

In order to make the scheme of this example more flexible, the MGC in the idle state under mutual-aid condition can also determine the working state of the mutual-aid MGC by detecting the heartbeat signal that its mutual-aid MGC sends, thus automatically switching from the idle state under mutual-aid condition to the mutual-aid non-activated state or the mutual-aid activated state.

Specifically speaking, if the MGC in the idle state under mutual-aid condition detects the heartbeat signal that its mutual-aid MGC sends and determines that its mutual-aid MGC works normally, the MGC will shift to the mutual-aid non-activated state directly, and takes over its primary MGWs; and if the MGC in the idle state under mutual-aid condition detects that the interrupt times of the heartbeat signal are more than or equal to the set threshold for the detection of the broken heartbeat signal which is sent by its mutual-aid MGC, the MGC believes its mutual-aid MGC has broken down, shifts to the mutual-aid activated state, and takes over its active and standby MGWs.

Example 3

In an unnormal state, for example, when the communication link between an MGC and its mutual-aid MGC breaks down but the two MGCs still work normally, the two MGCs will believe that the other side breaks down through the interruption of the heartbeat signal, then these two MGCs will shift to the mutual-aid activated state at the same time, that is, the "simultaneous active" situation. In this case, the two MGCs with the mutual-aid relation will both attempt to take over the MGWs that belong to the two MGCs, thus making the MGW unable to confirm which MGC it belongs to, and causing registration chaos of the MGW.

To solve the problem of "simultaneous active", the method of this example has improved the method of Example 1, making the MGW send the heartbeat signal to its primary MGC under any circumstances and choose a home MGC which currently performs the control command interaction with the MGW according to the heartbeat signal returned from the primary MGC. The method to choose a home MGC is that: the MGW detects the heartbeat signal returned from its primary MGC in real time, if the MGW can detect the heartbeat signal returned from its primary MGC, the MGW determines that the primary MGC is the current home MGC; if the interrupt times of the heartbeat signal returned from its primary MGC is more than or equal to the set threshold for the detection of the broken heartbeat signal of the system, the MGW determines that the standby MGC is the current home MGC. In this way, even in the "simultaneous active" state, it can be guaranteed that the MGW will choose its primary MGC first to make registration.

Detailed description according to FIG. 12 is as follows: in a normal state, MGC1 and MGC2 both work normally, therefore, MGW1 and MGW2 belong to MGC1, MGW3 and MGW4 belong to MGC2. Even that there is the "simultaneous active" situation at this moment, MGW1 and MGW2 will choose to perform the control command interaction with MGC1, instead of being controlled by MGC2. Likewise, MGW3 and MGW4 will choose to perform the control command interaction with MGC2 instead of being controlled by MGC1.

In the situation that MGW1 and MGW2 have already switching to MGC2, because these two MGWs still send the heartbeat signals to MGC1 periodically to monitor the state of MGC1 in real time, once MGC1 return to the normal state, these two MGWs will determine MGC1 as the MGC which they belong to once detecting the heartbeat signal returned from MGC1, and switch to MGC1 actively. At this moment, MGW1 and MGW2 will choose to perform the control command interactions with MGC1 even in the "simultaneous active" state, instead of being continuously controlled by MGC2.

It can be seen from the method of Example 3 that, by monitoring the state of its primary MGC in real time and setting the current home MGC according to the state of the primary MGC thereof, the MWGs can effectively prevent the registration chaos of the MGWs that may appear in case of "simultaneous active", which further improves the function of the MGW dual-homing.

All the implementation schemes mentioned above, relate to the problem of data consistency in the process of switching between the core control equipment with the relationship of dual-homing, i.e., how to guarantee the data consistency between the active core control equipment and the standby core control equipment after the MGW changes its core control equipment that provides the service, and how to make all the configuration data on the core control equipment to which the MGW has switched support the link connection and the service continuity processing of the MGW.

To solve the problem of data consistency, supposing that the core control equipment which the MGW will switch to is called the local end core control equipment, and the core control equipment with the dual-homing relationship with the local end core control equipment is called the peer end core control equipment. Then it is first necessary to make the local end core control equipment obtain and manage the data of the peer end core control equipment so as to utilize these data to control the equipment that the peer end core control equipment controls and take over the service of the other side.

There are many methods to obtain the data of the peer end core control equipment, for example: the peer end core control equipment sends its data to the local end core control equipment periodically, or the local end core control equipment reads the data from the peer end core control equipment periodically, then, saves the other side's data information in the databases of the local end core control equipment and the peer end core control equipment, respectively.

There are the following methods for the local end core control equipment to store the data of the peer end core control equipment:

1) Adding an indication bit of dual-homing configuration in each list of the databases of the local end core control equipment and the peer end core control equipment, the indication bit of dual-homing configuration is used for indicating whether the data is the data of the local end core control equipment or the data of the peer end core control equipment. It can be configured that 0 at the indication bit of dual-homing configuration means the data belong to the local end core control equipment; and 1 at the indication bit of dual-homing configuration means that the data belong to the peer end core control equipment.

When the core control equipment is a softswitch, according to the scheme, an indication bit of dual-homing configuration can be added, respectively, in a configuration list of MGW equipment, a configuration information list of attendant console, a list of MTP link, a list of M3UA link, a list of IUA link, a list of V5UA link, a list of M2UA link, a configuration list of V5 interface, a distribution list of the gateway domain name, a registration information list of the SIP equipment, and a registration information list of H323 equipment, in order to distinguish whether the data of each record in the lists is the data of the local end core control equipment or the data of the peer end core control equipment.

2) Setting up the data of the peer end core control equipment again in the form of list in the local end core control equipment and the peer end core control equipment. Setting up the same list as in the peer end core control equipment again in the local end core control equipment and the peer end core control equipment, when the peer end core control equipment is invalid due to such a reason as failure, utilizing the list of the peer end core control equipment in the local end core control equipment to set up the services of the peer end core control equipment and controlling the equipment that the peer end core control equipment controls.

3) Utilizing a sharing mechanism of the database to share the data of the peer end core control equipment.

The data of the local end core control equipment and the peer end core control equipment can also be put in a sharing database of a database system that supports a sharing mechanism. The sharing database can be put in an independent server, and both core control equipment can read the database. When the peer end core control equipment is invalid due to such a reason as failure, the data is utilized in the sharing database to set up the services of the peer end core control equipment and controlling the equipment that the peer end core control equipment controls.

Described below is the process for the local end core control equipment to take over the services of the peer end core control equipment.

According to the scheme, a state bit of the peer end core control equipment is established in the local end core control equipment, the value of the state bit of the peer end core control equipment is either normal state or out-of-service state. The state bit of the peer end core control equipment can be changed when the local end core control equipment starts or the state of the peer end core control equipment changes. For example, when the local end core control equipment starts, setting the state bit of the peer end core control equipment as the normal state; when the handshaking between the local end core control equipment and the peer end core control equipment fails, which means that the peer end core control equipment is invalid, setting the state bit of the peer end core control equipment as the out-of-service state.

During the starting of the local end core control equipment, setting the state bit of the peer end core control equipment as the normal state at first, thus neglecting the data with the dual-homing identification bit indicating the peer end core control equipment. In this way, the local end core control equipment will not process the communication services related with the peer end core control equipment but manages and processes only the data managed by itself, and processes the communication services according to the data.

During the running of the local end core control equipment, when the peer end core control equipment is in the normal running state, the local end core control equipment can receive and store the data of the peer end core control equipment, but will not process the relevant service according to the stored data.

Figure 13:
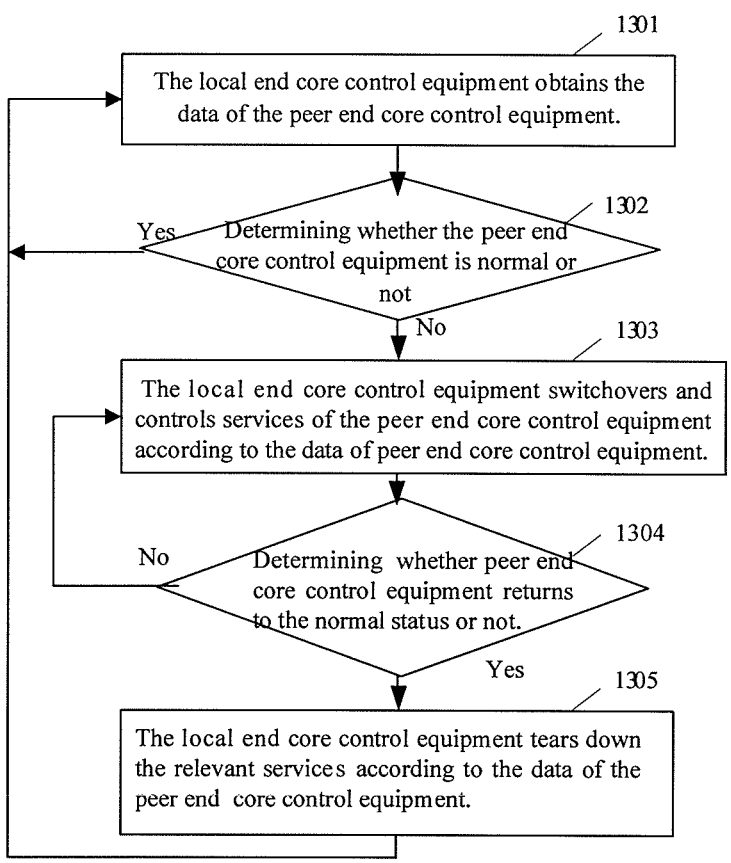
FIG. 13 is a flow chart illustrating the data processing in dual-homing networking in accordance with a preferred embodiment of the present invention.

As shown in FIG. 13, the data processing put forward by the embodiment of the present invention includes the following steps:

Step 1301: During the running of the local end core control equipment, the local end core control equipment obtains the data of the peer end core control equipment.

Step 1302: Determining whether the peer end core control equipment is in normal state or not, if the peer end core control equipment is in normal state, return to Step 1301, otherwise, proceed to Step 1303

Here, determining whether the peer end core control equipment is in normal state or not can be implemented through the handshake mechanism, that is, the local end core control equipment shakes hand with the peer end core control equipment periodically, if the handshake is successful, determining that the peer end core control equipment is in normal state, and setting the identification bit of the peer end core control equipment as the normal state, otherwise, determine that the peer end core control equipment is in out-of-service state, and set the identification location of the peer end core control equipment as the out-of-service state.

Step 1303: When the identification bit of the peer end core control equipment is invalid, the local end core control equipment takes over the services of the peer end core control equipment according to the data of the peer end core control equipment, and controls the equipment the peer end core control equipment controlled. The local end core control equipment sets up the relevant services according to the data of the peer end core control equipment, and operates the established services and controls the equipment related with the data of the peer end core control equipment.

Step 1304: Determining whether the peer end core control equipment has returned to normal state or not, if the peer end core control equipment has returned to normal state, proceed to Step 1305, otherwise return to Step 1303.

Here, whether the peer end core control equipment has returned to normal state may be determined as well through the above-mentioned handshake mechanism.

Step 1305: The local end core control equipment removes the relevant services according to the data of the peer end core control equipment, and the services are switched back to the peer end core control equipment, and then return to Step 1301 to obtain the data of the peer end core control equipment.

Here, the local end core control equipment and the peer end core control equipment are in relative terms. The process that the local end core control equipment takes over the peer end core control equipment when the peer end core control equipment breaks down has been described above, likewise, when the local end core control equipment breaks down, the process of the peer end core control equipment takes over the local end core control equipment is totally the same as the above-mentioned process.

In addition, the scheme is applicable to the situation of single-homing, i.e., when the local end core control equipment breaks down, the peer end core control equipment will take over all the services of the local end core control equipment, while when the peer end core control equipment breaks down, the local end core control equipment will not take over the service of the peer end core control equipment.

The embodiments of the present invention are applicable to the situation of multi-homing too, i.e., when the local end core control equipment breaks down, one of the other core control equipment will take over all the services of the local end core control equipment according to a certain policy, when any of the other core control equipment breaks down, the local end core control equipment may as well take over the services of the core control equipment that breaks down.

Figure 14:
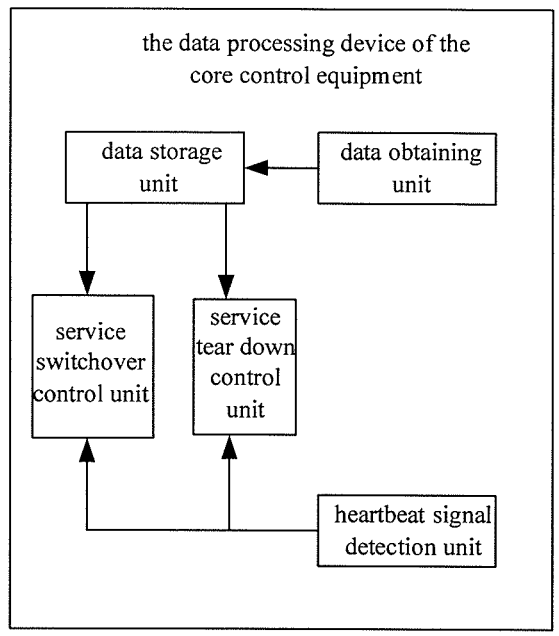
FIG. 14 is a diagram illustrating an apparatus structure to implement the data processing in the core control equipment in accordance with a preferred embodiment of the present invention.

The scheme can be implemented by the equipment as shown in FIG. 14, FIG. 14 shows the composition of the data processing device in the core control equipment. The equipment illustrated in FIG. 14 can be located in the local end core control equipment or the peer end core control equipment, including: a data storage unit that is used to store the data of the peer end core control equipment, a heartbeat signal detection unit, a data obtaining unit, a service switchover control unit and a service tear down control unit. The data storage unit, connecting with the data obtaining unit, is used for storing the data of the peer end core control equipment obtained by the data obtaining unit. The heartbeat signal detection unit connects with the peer end core control equipment, the service switchover control unit and the service tear down control unit, and is used for detecting the state of the peer end core control equipment, and informing the service switchover control unit and the service tear down control unit about the detected state of the peer end core control equipment. The data obtaining unit connects with the peer end core control equipment and the data storage unit, and is used for obtaining the data of the peer end core control equipment, and storing the obtained data in the data storage unit. The Service switchover control unit connects with the heartbeat signal detection unit and the data storage unit, and is used for taking over the service of the peer end core control equipment, controlling the equipment that the peer end core control equipment controlled, and utilizing the data of the peer end core control equipment stored in the data storage unit when the state of the peer end core control equipment is invalid as detected by the heartbeat signal detection unit.

The service tear down control unit connects with the heartbeat signal detection unit and the data storage unit, and is used for tearing down the services of the peer end core control equipment that have been taken over by the local end core control equipment according to the data of the peer end core control equipment stored in the data storage unit, and returning the services to the peer end core control equipment when the heartbeat signal detection unit detects the peer end core control equipment has shifted from the out-of-service state to the normal state.

Only the composition of the data processing device of one core control equipment is provided in FIG. 14, that is, the case of single-homing. In the case of dual-homing, the composition of the peer end core control equipment and the function of each part thereof are the same as those of the local end core control equipment. In the case of multi-homing, the composition of each core control equipment and the function of each part of the equipment are the same as those the local end core control equipment in the case of the single-homing.

The data consistency scheme put forward by the embodiment of the present invention makes it possible to recover the communication services of the invalid core control equipment in time through the dual-homing data processing scheme above-mentioned when either core control equipment becomes invalid due to such reasons as a failure, etc. Therefore, the communication system of the scheme has high self-healing capability.

Figure 15:
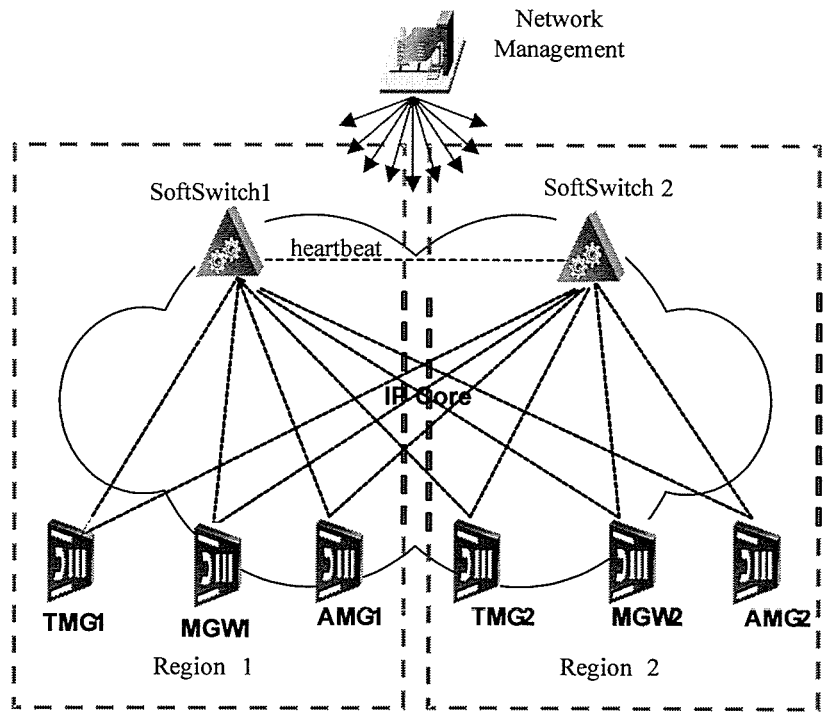
FIG. 15 is a schematic diagram illustrating the solution of dynamic dual-homing.

In the solution of dynamic dual-homing, two softswitches work in a load sharing mode, that is: the two softswitches process the services at the same time in the normal state. Although the configuration of these two softswitches may have some differences, as the data of the mutual-aid user, signaling and relaying can implement the standby function of the service in the normal state, when the two mutual-aid softswitches accessing the NGN at the same time. As shown in FIG. 15, when the softswitch in area 1 breaks down, the services of the softswitch can be switched to the softswitch in area 2 in a manual/automatic switching mode, thus the softswitch of area 2 can undertake the services of the NGN.

The dual-homing control mechanism of the softswitch is actively made up of two parts: one is the dual-homing mechanism controlled by the gateway, the other is the dual-homing mechanism controlled by the service, the networking state is shown in FIG. 15, two load sharing softswitches may be physically located in different geographical areas, and are presented as two independent switch offices in networking, that is to say, only in the state that one of them is invalid will the other softswitch undertake the gateway control function and the service control function of the two switch offices at the same time.

A heartbeat link is set up between the two softswitches, and whether the work of the peer end softswitch is normal or not can be detected by a softswitch through the heartbeat communication via a private or a standard protocol.

The dual-homing mechanism controlled by the gateway is that: each softswitch in the mutual-aid relationship is configured not only with the data of its active control gateway equipment but also with the data of its standby control equipment, and each gateway equipment and packet terminal, for example, an H.323 Phone, an OpenEye, etc, is also configured with the information of the primary softswitch and the standby softswitch. In this way, when a certain softswitch breaks down or the switching of dual-homing is executed, the gateway equipment that the primary softswitch controlled will register to the standby softswitch again automatically, or register to the standby softswitch again according to the instruction of the standby softswitch.

The dual-homing mechanism controlled by the service is that: through a unified plan between two mutual-aid softswitches of such office data and user data about a local prefix number set, a call source code, a charging source code, a user number section, a route number, a route selection code, a relaying group number, and a call prefix, one of the two softswitches can take over all the services of the other softswitch. Before and after the switching, such attributes as call and charging of all users are not influenced.

A unified network management is configured in the system, which carries out a centralized management for all the parts in the network, so as to ensure that the office data or the user data of the two softswitches keep consistent or coordinated.

When the softswitch is in the mutual-aid working mode, the process of shifting the mutual-aid state of the softswitch to the mutual-aid activated state from the mutual-aid non-activated state, or to the mutual-aid non-activated state from the mutual-aid activated state is called switching. The switching can be categorized into two modes, the manual mode and the automatic mode. The manual switching mode means that the mutual-aid state of the softswitch working in the mutual-aid mode cannot be changed until the maintainer issues a switching command to the softswitch through the terminal system or the network management system. The automatic switching mode means that a softswitch working in the mutual-aid mode determines automatically whether to change its mutual-aid state according to the state of the heartbeat link between its mutual-aid softswitch and itself.

What is claimed is:

1. In a dual-homing system, a first media gateway controller controlling a first media gateway entity, a second media gateway controller controlling a second media gateway entity, a method executed by the first media gateway controller comprising:
    setting up a media gateway entity list recording information of media gateway entities that is controlled by the first media gateway controller;
    determining a failure of the second media gateway controller by monitoring heartbeat signals sent from the second media gateway controller;
    based upon the determination, updating the media gateway entity list by adding information of the second media gateway entity in the media gateway entity list;
    receiving a registration request from the second media gateway entity;
    verifying the registration request according to the media gateway entity list; and
    based upon successful verification, setting up a standby link with the second gateway entity to control the second gateway entity.

2. The method according to claim 1, wherein determining the failure of the second media gateway controller comprises:
    determining that the second media gateway controller is failed if interrupt times of heartbeat signals reaches a preset threshold.

3. The method according to claim 1 further comprises:
    receiving at least one heartbeat signal from the second media gateway controller;
    determining a recovery of the second media gateway controller according to the received at least one heartbeat signal; and
    based upon the determination, removing the standby link with the second gateway entity.

4. In a dual-homing system, a first media gateway controller controlling a first media gateway entity, a second media gateway controller controlling a second media gateway entity, a non-transitory computer program product stored on a non-transitory computer readable medium comprising computer executable instruction that when executed implement the following:
    set up a media gateway entity list recording information of media gateway entities that is controlled by the first media gateway controller;
    determine a failure of the second media gateway controller by monitoring heartbeat signals sent from the second media gateway controller;
    based upon the determination, update the media gateway entity list by adding information of the second media gateway entity in the media gateway entity list;
    receive a registration request from the second media gateway entity;
    verify the registration request according to the media gateway entity list; and
    based upon successful verification, set up a standby link with the second gateway entity to control the second gateway entity.

5. The computer program product of claim 4, wherein determine the failure of the second media gateway controller comprises:
    determine that the second media gateway controller is failed if interrupt times of heartbeat signals reaches a preset threshold.

6. The computer program product of claim 4 further comprises:
    receive at least one heartbeat signal from the second media gateway controller;
    determine a recovery of the second media gateway controller according to the received at least one heartbeat signal; and
    based upon the determination, remove the standby link with the second gateway entity.

* * * * *